US012795363B2

(12) United States Patent
Damnjanovic et al.

(10) Patent No.: US 12,795,363 B2
(45) Date of Patent: Nov. 10, 2026

(54) SECURITY HANDLING FOR UE COOPERATION FEATURE

(71) Applicant: QUALCOMM Incorporated, San Diego, CA (US)

(72) Inventors: Aleksandar Damnjanovic, Del Mar, CA (US); Rajat Prakash, San Diego, CA (US); Soo Bum Lee, San Diego, CA (US); Deepak Khandelwal, San Diego, CA (US); Ajit Kumar Chourasia, San Diego, CA (US); Ramesh Kumar Goel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 705 days.

(21) Appl. No.: 18/069,132

(22) Filed: Dec. 20, 2022

(65) Prior Publication Data

US 2024/0205676 A1 Jun. 20, 2024

(51) Int. Cl.
*H04W 12/08* (2021.01)
*H04W 74/0833* (2024.01)
*H04W 84/12* (2009.01)
*H04W 88/04* (2009.01)

(52) U.S. Cl.
CPC ....... *H04W 12/08* (2013.01); *H04W 74/0833* (2013.01); *H04W 84/12* (2013.01); *H04W 88/04* (2013.01)

(58) Field of Classification Search
CPC . H04W 12/08; H04W 74/0833; H04W 84/12; H04W 88/04; H04W 12/041
See application file for complete search history.

(56) References Cited

U.S. PATENT DOCUMENTS

| | | | | |
|---|---|---|---|---|
| 2016/0006707 A1* | 1/2016 | Ying | H04W 88/04 713/153 |
| 2017/0150363 A1* | 5/2017 | Tenny | H04L 63/102 |
| 2019/0274051 A1* | 9/2019 | Li | H04L 63/123 |
| 2019/0313248 A1* | 10/2019 | Middelesch | H04W 36/0038 |
| 2019/0380120 A1* | 12/2019 | Nair | H04B 7/15 |
| 2020/0196377 A1* | 6/2020 | Fang | H04W 76/11 |
| 2020/0336305 A1* | 10/2020 | Li | H04L 9/0844 |
| 2022/0124573 A1* | 4/2022 | Tsai | H04W 36/0079 |

(Continued)

FOREIGN PATENT DOCUMENTS

CN 113891310 A * 1/2022 ........... H04W 24/02

*Primary Examiner* — Liem H. Nguyen
(74) *Attorney, Agent, or Firm* — ArentFox Schiff LLP

(57) ABSTRACT

Thus, aspects of the present disclosure allow for a target UE to utilize a cooperative device to communicate with a base station when the target UE is out of coverage or in poor radio connections, but can still connect to another UE over a non-3GPP technology. Aspects of the present disclosure may receive a derived radio resource control (RRC) key from a user equipment (UE) in a non-Third Generation Partnership Project (non-3GPP) link between the apparatus and the UE. In some aspects, the UE is out of coverage of a network entity in a 3GPP link with the apparatus. In another instance, aspects of the present disclosure may receive control data from the network entity in the 3GPP link using the derived RRC key. In yet another instance, aspects of the present disclosure may transmit the control data to the UE in the non-3GPP link.

30 Claims, 23 Drawing Sheets

(56) References Cited

U.S. PATENT DOCUMENTS

| | | | | |
|---|---|---|---|---|
| 2023/0319549 | A1 * | 10/2023 | Dees | H04W 12/02<br>455/410 |
| 2024/0163760 | A1 * | 5/2024 | Ahluwalia | H04W 36/0033 |

* cited by examiner

400

SECURITY HANDLING FOR UE COOPERATION FEATURE

TECHNICAL FIELD

The present disclosure generally relates to communication systems, and more particularly, to a wireless communication system between a network device and a user equipment (UE).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the subject matter described in this disclosure can be implemented in an apparatus for wireless communication at a user equipment. The apparatus includes a memory and at least one processor coupled to the memory. The processor is configured to receive a derived radio resource control (RRC) key from a user equipment (UE) in a non-Third Generation Partnership Project (non-3GPP) link between the apparatus and the UE. The processor is also configured to receive control data from the network entity in the 3GPP link using the derived RRC key. The processor is further configured to transmit the control data to the UE in the non-3GPP link.

In another aspect, the subject matter described in this disclosure can be an apparatus for wireless communication at a UE. The apparatus includes a memory and at least one processor coupled to the memory. The processor is configured to transmit a derived radio resource control (RRC) key to a user equipment (UE) in a non-Third Generation Partnership Project (non-3GPP) link between the apparatus and the UE. The processor is also configured to transmit control data to the network entity, via the UE in the non-3GPP link, using the derived RRC key.

In another aspect, the subject matter described in this disclosure can be implemented in a method for wireless communication by an apparatus. The method includes receiving a derived radio resource control (RRC) key from a user equipment (UE) in a non-Third Generation Partnership Project (non-3GPP) link between the apparatus and the UE. The method also includes receiving control data from the network entity in the 3GPP link using the derived RRC key. The method further includes transmitting the control data to the UE in the non-3GPP link.

In another aspect, the subject matter described in this disclosure can be implemented in a method for wireless communication at an apparatus. The method includes transmitting a derived radio resource control (RRC) key to a user equipment (UE) in a non-Third Generation Partnership Project (non-3GPP) link between the apparatus and the UE. The method also includes transmitting control data to the network entity, via the UE in the non-3GPP link, using the derived RRC key.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1A:
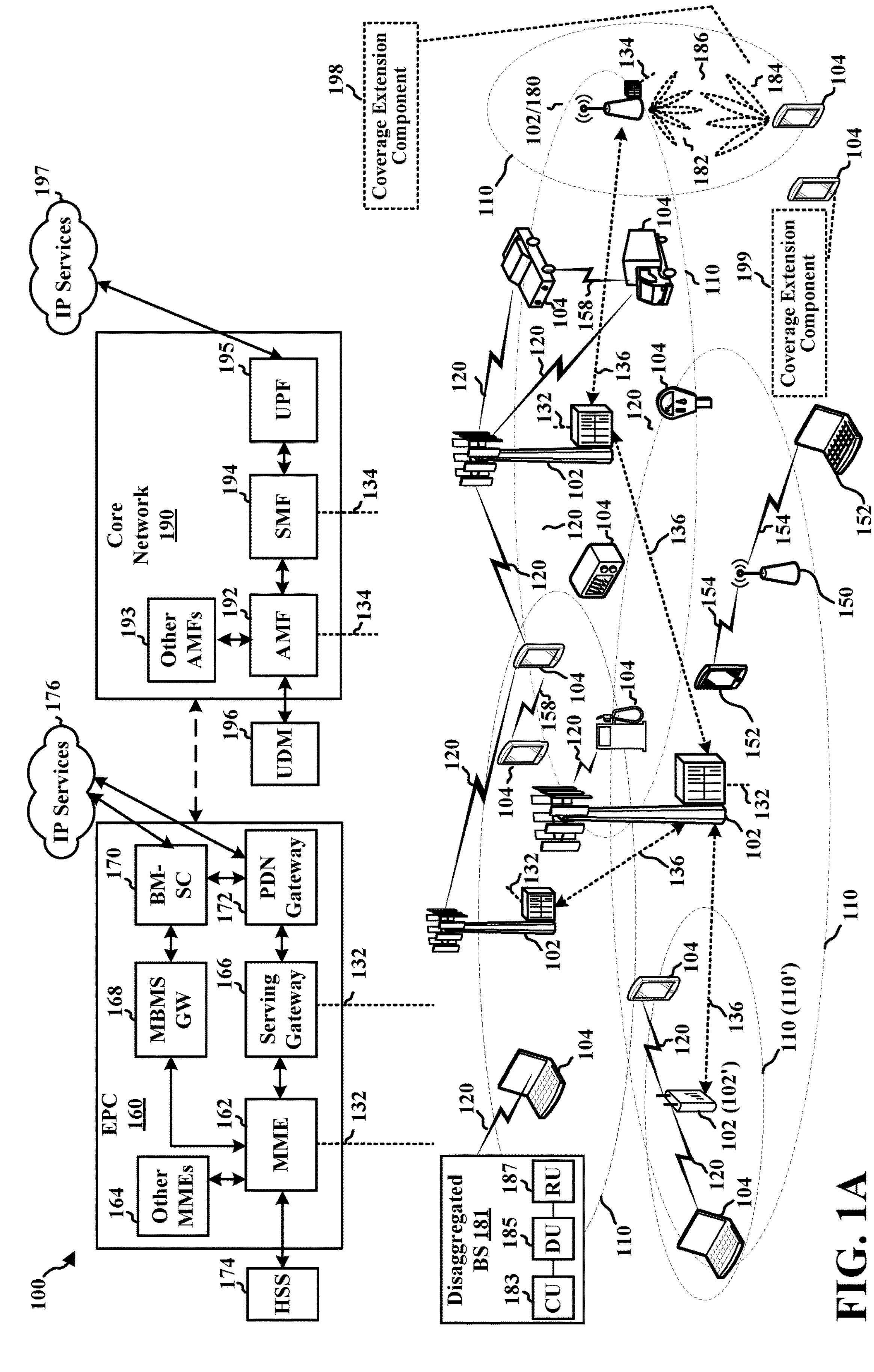
FIG. 1A is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, the concepts and related aspects described in the present disclosure may be implemented in the absence of some or all of such specific details. In some instances, well-known structures, components, and the like are shown in block diagram form in order to avoid obscuring such concepts.

An out-of-coverage user equipment (UE) that is not within a base station cell may share its derived ciphering, integrity protection, or other radio resource control (RRC) keys with an in-coverage UE within the base station cell. The derived RRC keys may allow the in-coverage UE (referred to throughout this disclosure as a cooperative UE) to maintain a link between the in-coverage UE and the out-of-coverage UE so that the out-of-coverage UE (referred to throughout this disclosure as a target UE) may communicate with the base station. Specifically, the target UE may share its radio resource control (RRC) keys with the cooperative UE to facilitate downlink (DL) and uplink (UL) communications. For instance, the target UE may transmit keys associated with an RRC layer to a cooperative UE via a non-Third Generation Partnership Project (non-3GPP) link such as a Wi-Fi link, and the target UE may receive/transmit data in response to using these RRC keys and/or control plane data with the base station via the cooperative UE. The cooperative UE may communicate with the base station via a 3GPP link such as a 5G link or an LTE link. The target UE may exchange keys for the control plane but not the user plane, and the target UE may initiate communications by sending a request for cooperation. The target UE may transmit its keys to the cooperative UE via the Wi-Fi link so that the base station may send layer 3 or higher (e.g., RRC or non-access stratum (NAS)) messages to the target UE by way of the 5G link with cooperative UE and the Wi-Fi link with the target UE. The target UE or cooperative UE may terminate cooperation and thus the Wi-Fi link, for example, if the target UE moves in coverage of the base station cell, or if the cooperative UE no longer determines to serve as a relay between the base station and the target UE. The target UE may also update its derived RRC keys from time to time in response to respective security mode commands received from the base station via the cooperative UE so that communication security may be maintained.

Thus, aspects of the present disclosure allow for a target UE to utilize a cooperative device to communicate with a base station when the target UE is out of coverage or in poor radio connections, but can still connect to another UE over a non-3GPP technology. Aspects of the present disclosure allow a UE to appear to a 3GPP network (e.g., 5G/LTE) as a target device while utilizing the hardware and software of the cooperative device such that the network is unaware that the cooperative UE is being used as a relay by the target UE. Aspects of the present disclosure allow the base station to communicate with the cooperative UE using a 3GPP link while the communication related to the target UE between the cooperative UE and the target UE will be via a non-3GPP link. Using a non-3GPP link for communication between the cooperative UE and target UE allows aspects of the present disclosure to be transparent to the network such that the communicating devices do not require coordination between the network and devices according to a pre-configured agreement to setup the link. Instead, the UEs may associate with each other or discover each other independently of the base station using Wi-Fi protocols, and the base station may rely on the cooperative UE to communicate with the target UE.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

A target UE may be out of a 3GPP network with a base station, but it may be helpful for the base station to connect with the target UE. When the target UE is out of network coverage with the base station, the target UE cannot use the 3GPP network. Instead, the target UE may use a cooperative UE to act as a relay between the base station and the target UE. If the target UE moves back into network coverage with the base station, the target UE may determine to no longer use the cooperative UE.

A cooperative UE may be utilized to address poor coverage scenarios to extend coverage extension when an active target UE is out of range of a 3GPP network with a network entity such as a base station. In particular, the cooperative UE may act as a proxy between the network entity and the active target UE. Specifically, the network entity may communicate with the cooperative UE using a 3GPP link (e.g., 5G/LTE), while the communication that may be relayed to the target UE may be via a sidelink Wi-Fi link between the cooperative UE and active target UE. The base station may be, for example, a gNB or an eNB. An advantage of using Wi-Fi or other non-3GPP link for the sidelink communication, in contrast to using 5G/LTE or other 3GPP link for the sidelink communication, is that a non-3GPP link between the cooperative UE and the target UE may be more transparent to the network than a 3GPP link between the cooperative UE and the target UE. For example, with a Wi-Fi link, the target UE may not be required to receive resource allocations or other configurations from the gNB or eNB according to a pre-configured agreement in order to establish or maintain the connection with the cooperative UE. Instead, the cooperative UE may autonomously connect with the active target UE via the Wi-Fi link without base station involvement, providing network transparency. Moreover, Wi-Fi is ubiquitous since most devices currently have Wi-Fi access.

FIG. 1A is a diagram illustrating an example of a wireless communications system and an access network 100. The wireless communications system (also referred to as a wireless wide area network (WWAN)) includes network devices 102, UE(s) 104, an Evolved Packet Core (EPC) 160, and another core network 190 (e.g., a 5G Core (5GC)). The network devices 102 may include macrocells, such as high power cellular network devices, and/or small cells, such as low power cellular network devices (including femtocells, picocells, and microcells). In some aspects, the network device may include a base station (BS).

The network devices 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The network devices 102 configured for 5G New Radio (NR), which may be collectively referred to as the Next Generation Radio Access Network (RAN) (NG-RAN), may interface with a core network 190 through second backhaul links 134. In addition to other functions, the network devices 102 may perform one or more of: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the network devices 102 may communicate directly or indirectly (e.g., through the EPC 160 or core network 190) with each other over third backhaul links 136 (e.g., X2 interface). The first backhaul links 132, the second backhaul links 134, and the third backhaul links 136 may be wired, wireless, or some combination thereof. At least some of the network devices 102 may be configured for integrated access and backhaul (IAB). Accordingly, such network devices may wirelessly communicate with other network devices, which also may be configured for IAB.

At least some of the network devices 102 configured for IAB may have a split architecture including multiple units, some or all of which may be collocated or distributed and which may communicate with one another.

The network devices 102 may wirelessly communicate with the UEs 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.).

A UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Each of the network devices 102 may provide communication coverage for a respective geographic coverage area 110, which may also be referred to as a "cell." Potentially, two or more geographic coverage areas 110 may at least partially overlap with one another, or one of the geographic coverage areas 110 may contain another of the geographic coverage areas. For example, the small cell 102' may have a coverage area 110' that overlaps with the coverage area 110 of one or more macro network devices 102. A network that includes both small cells and macrocells may be known as a heterogeneous network. A heterogeneous network may also include Home Evolved Node BS (eNBs) (HeNBs), which may provide service to a restricted group known as a closed subscriber group (CSG).

The communication links 120 between the network devices 102 and the UEs 104 may include uplink (also referred to as reverse link) transmissions from a UE 104 to a network device 102 and/or downlink (also referred to as forward link) transmissions from a network device 102 to a UE 104. The communication links 120 may use multiple-input and multiple-output (MIMO) antenna technology, including spatial multiplexing, beamforming, and/or transmit diversity. Wireless links or radio links may be on one or more carriers, or component carriers (CCs). The network devices 102 and/or UEs 104 may use spectrum up to Y megahertz (MHz) (e.g., Y may be equal to or approximately equal to 5, 10, 15, 20, 100, 400, etc.) bandwidth per carrier allocated in a carrier aggregation of up to a total of Yx MHz (e.g., x CCs) used for transmission in each direction. The CCs may or may not be adjacent to each other. Allocation of CCs may be asymmetric with respect to downlink and uplink (e.g., more or fewer CCs may be allocated for downlink than for uplink).

The CCs may include a primary CC and one or more secondary CCs. A primary CC may be referred to as a primary cell (PCell) and each secondary CC may be referred to as a secondary cell (SCell). The PCell may also be referred to as a "serving cell" when the UE is known both to a network device at the access network level and to at least one core network entity (e.g., AMF and/or MME) at the core network level, and the UE may be configured to receive downlink control information in the access network (e.g., the UE may be in an RRC Connected state). In some instances, in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band. In some aspects, "mmW" or "near-mmW" may additionally or alternatively refer to a 60 GHz frequency range, which may include multiple channels outside of 60 GHz. For example, a 60 GHz frequency band may refer to a set of channels spanning from 57.24 GHz to 70.2 GHz.

In view of the foregoing, unless specifically stated otherwise, the term "sub-6 GHz," "sub-7 GHz," and the like, to the extent used herein, may broadly represent frequencies that may be less than 6 GHz, frequencies that may be less than 7 GHz, frequencies that may be within FR1, and/or frequencies that may include mid-band frequencies. Further, unless specifically stated otherwise, the term "millimeter wave" and other similar references, to the extent used herein, may broadly represent frequencies that may include mid-band frequencies, frequencies that may be within FR2, and/or frequencies that may be within the EHF band.

A network device 102 may be implemented as a macro network device providing a large cell or may be implemented as a small cell 102' having a small cell coverage area. Some network devices 102 may operate in a traditional sub-6 GHz (or sub-7 GHz) spectrum, in mmW frequencies, and/or near-mmW frequencies in communication with the UE 104. When such a network device operates in mmW or near-mmW frequencies, the network device may be referred to as a mmW network device 180. The mmW network device 180 may utilize beamforming 186 with the UE 104 to compensate for the path loss and short range. The network device 180 and the UE 104 may each include a plurality of antennas, such as antenna elements, antenna panels, and/or antenna arrays to facilitate the beamforming.

The network device 180 may transmit a beamformed signal to the UE 104 in one or more transmit directions 182.

The UE 104 may receive the beamformed signal from the network device 180 in one or more receive directions 184. The UE 104 may also transmit a beamformed signal to the network device 180 in one or more transmit directions. The network device 180 may receive the beamformed signal from the UE 104 in one or more receive directions. One or both of the network device 180 and/or the UE 104 may perform beam training to determine the best receive and/or transmit directions for the one or both of the network device 180 and/or UE 104. The transmit and receive directions for the network device 180 may or may not be the same. The transmit and receive directions for the UE 104 may or may not be the same.

In various different aspects, one or more of the network devices 102/180 may include and/or be referred to as a gNB, Node B, eNB, an access point, a base transceiver station, a radio network device, a radio transceiver, a transceiver function, a basic service set (BSS), an extended service set (ESS), a transmit reception point (TRP), or some other suitable terminology.

In some aspects, one or more of the network devices 102/180 may be connected to the EPC 160 and may provide respective access points to the EPC 160 for one or more of the UEs 104. The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, with the Serving Gateway 166 being connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the network devices 102 belonging to a Multicast Broadcast Single Frequency Network (MBSFN) area broadcasting a particular service, and may be responsible for session management (start/stop) and for collecting eMBMS related charging information.

In some other aspects, one or more of the network devices 102/180 may be connected to the core network 190 and may provide respective access points to the core network 190 for one or more of the UEs 104. The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

Deployment of communication systems, such as 5G NR systems, may be arranged in multiple manners with various components or constituent parts. In a 5G NR system, or network, a network node, a network entity, a network device, a mobility element of a network, a RAN node, a core network node, a network element, network device, or a network equipment, such as a BS, or one or more units (or one or more components) performing network device functionality, may be implemented in an aggregated or disaggregated architecture. For example, a BS (such as a Node B (NB), eNB, NR BS, 5G NB, access point (AP), a TRP, or a cell, etc.) may be implemented as an aggregated network device (also known as a standalone BS or a monolithic BS) or a disaggregated network device.

An aggregated network device may be configured to utilize a radio protocol stack that is physically or logically integrated within a single RAN node. A disaggregated network device 181 may be configured to utilize a protocol stack that is physically or logically distributed among two or more units (such as one or more central units (CU), one or more distributed units (DUs), or one or more radio units (RUs)). In some aspects, a CU 183 may be implemented within a RAN node, and one or more DUs 185 may be co-located with the CU, or alternatively, may be geographically or virtually distributed throughout one or multiple other RAN nodes. The DUs may be implemented to communicate with one or more RUs 187. Each of the CU, DU and RU also can be implemented as virtual units, i.e., a virtual central unit (VCU), a virtual distributed unit (VDU), or a virtual radio unit (VRU).

Network device-type operation or network design may consider aggregation characteristics of network device functionality. For example, disaggregated network devices may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated network device, or disaggregated RAN architecture, can be configured for wired or wireless communication with at least one other unit.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring back to FIG. 1A, in certain aspects, the UE 104 may include a coverage extension component 198 that is configured to receive a derived radio resource control (RRC) key from a user equipment (UE) in a non-Third Generation Partnership Project (non-3GPP) link between the apparatus and the UE. In some aspects, the UE is out of coverage of a network entity in a 3GPP link with the apparatus. The coverage extension component 198 may also be configured to receive control data from the network entity in the 3GPP link using the derived RRC key. The coverage extension component 198 may further be configured to transmit the control data to the UE in the non-3GPP link.

Referring back to FIG. 1A, in certain aspects, the UE 104 may include a coverage extension component 199 that is configured to transmit a derived radio resource control (RRC) key to a user equipment (UE) in a non-Third Generation Partnership Project (non-3GPP) link between the apparatus and the UE, where the apparatus is out of coverage of a network entity in a 3GPP link with the UE. The coverage extension component 198 may further be configured to transmit control data to the network entity, via the UE in the non-3GPP link, using the derived RRC key.

Figure 1B:
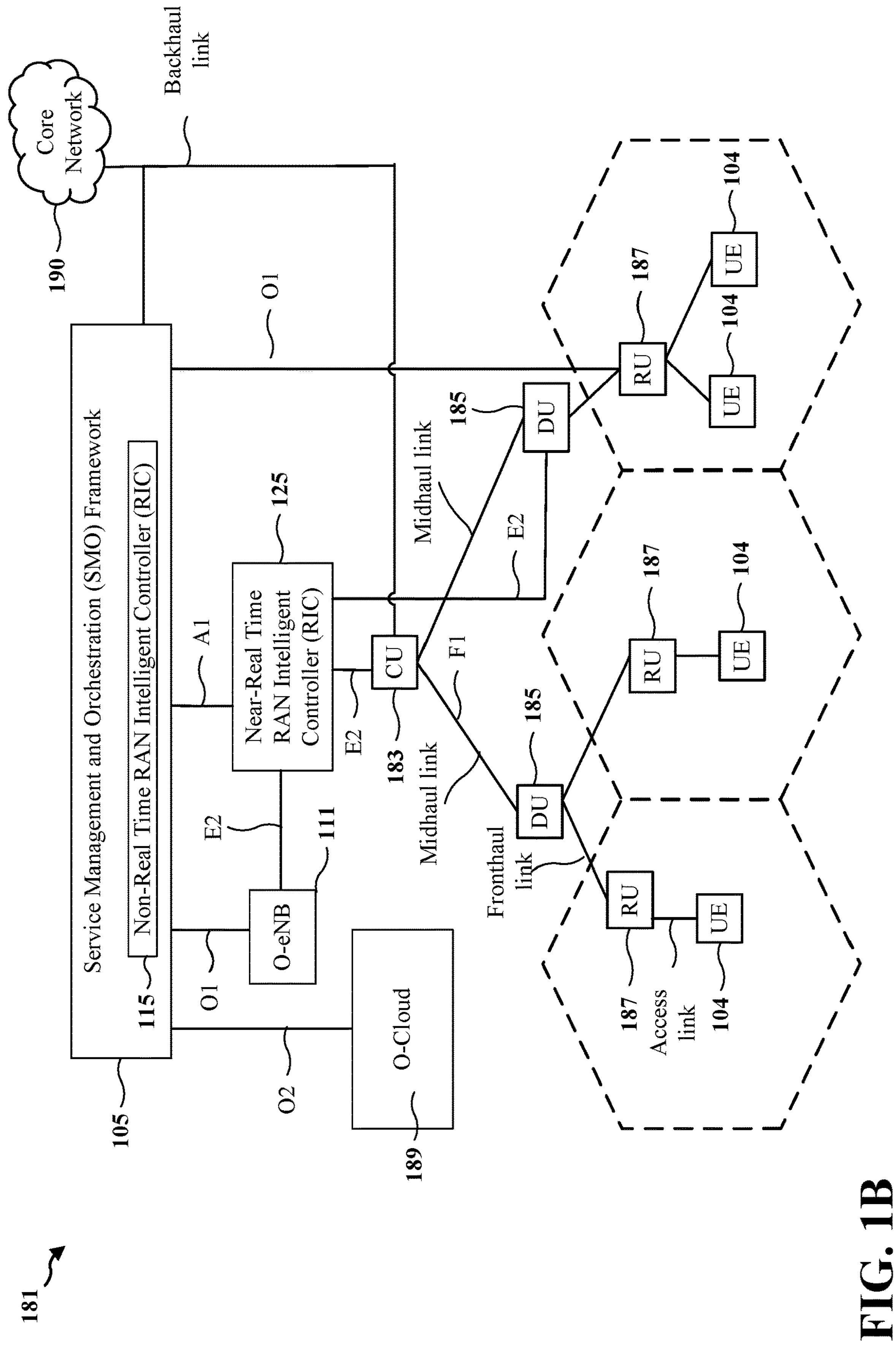
FIG. 1B is a conceptual diagram of an example Open Radio Access Network architecture.

FIG. 1B shows a diagram illustrating an example disaggregated network device 181 architecture. The disaggregated network device 181 architecture may include one or more CUs 183 that can communicate directly with core network 190 via a backhaul link, or indirectly with the core network 190 through one or more disaggregated network device units (such as a Near-Real Time RIC 125 via an E2 link, or a Non-Real Time RIC 115 associated with a Service Management and Orchestration (SMO) Framework 105, or both). A CU 183 may communicate with one or more DUs 185 via respective midhaul links, such as an F1 interface. The DUs 185 may communicate with one or more RUs 187 via respective fronthaul links. The RUs 187 may communicate respectively with UEs 104 via one or more radio frequency (RF) access links. In some implementations, the UE 104 may be simultaneously served by multiple RUs 187.

Each of the units, i.e., the CUs 183, the DUs 185, the RUs 187, as well as the Near-RT RICs 125, the Non-RT RICs 115 and the SMO Framework 105, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 183 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 183. The CU 183 may be configured to handle user plane functionality (i.e., Central Unit-User Plane (CU-UP)), control plane functionality (i.e., Central Unit-Control Plane (CU-CP)), or a combination thereof. In some implementations, the CU 183 can be logically split into one or more CU-UP units and one or more CU-CP units. The CU-UP unit can communicate bidirectionally with the CU-CP unit via an interface, such as the E1 interface when implemented in an O-RAN configuration. The CU 183 can be implemented to communicate with the DU 185, as necessary, for network control and signaling.

The DU 185 may correspond to a logical unit that includes one or more network device functions to control the operation of one or more RUs 187. In some aspects, the DU 185 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 185 may further host one or more low PHY layers. Each layer (or module) can be implemented with an interface configured to communicate signals with other layers (and modules) hosted by the DU 185, or with the control functions hosted by the CU 183.

Lower-layer functionality can be implemented by one or more RUs 187. In some deployments, an RU 187, controlled by a DU 185, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 187 can be implemented to handle over the air (OTA) communication with one or more UEs 104. In some implementations, real-time and non-real-time aspects of control and user plane communication with the RU(s) 187 can be controlled by the corresponding DU 185. In some scenarios, this configuration can enable the DU(s) 185 and the CU 183 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements, which may be managed via an operations and maintenance interface (such as an O1 interface). For virtualized network elements, the SMO Framework 105 may be configured to interact with a cloud computing platform (such as an open cloud (O-Cloud) 189) to perform network element life cycle management (such as to instantiate virtualized network elements) via a cloud computing platform interface (such as an O2 interface). Such virtualized network elements can include, but are not limited to, CUs 183, DUs 185, RUs 187 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 187 via an O1 interface. The SMO Framework 105 also may include the Non-RT RIC 115 configured to support functionality of the SMO Framework 105.

The Non-RT RIC 115 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 183, one or more DUs 185, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

Figures 2A, 2B, 2C, 2D:
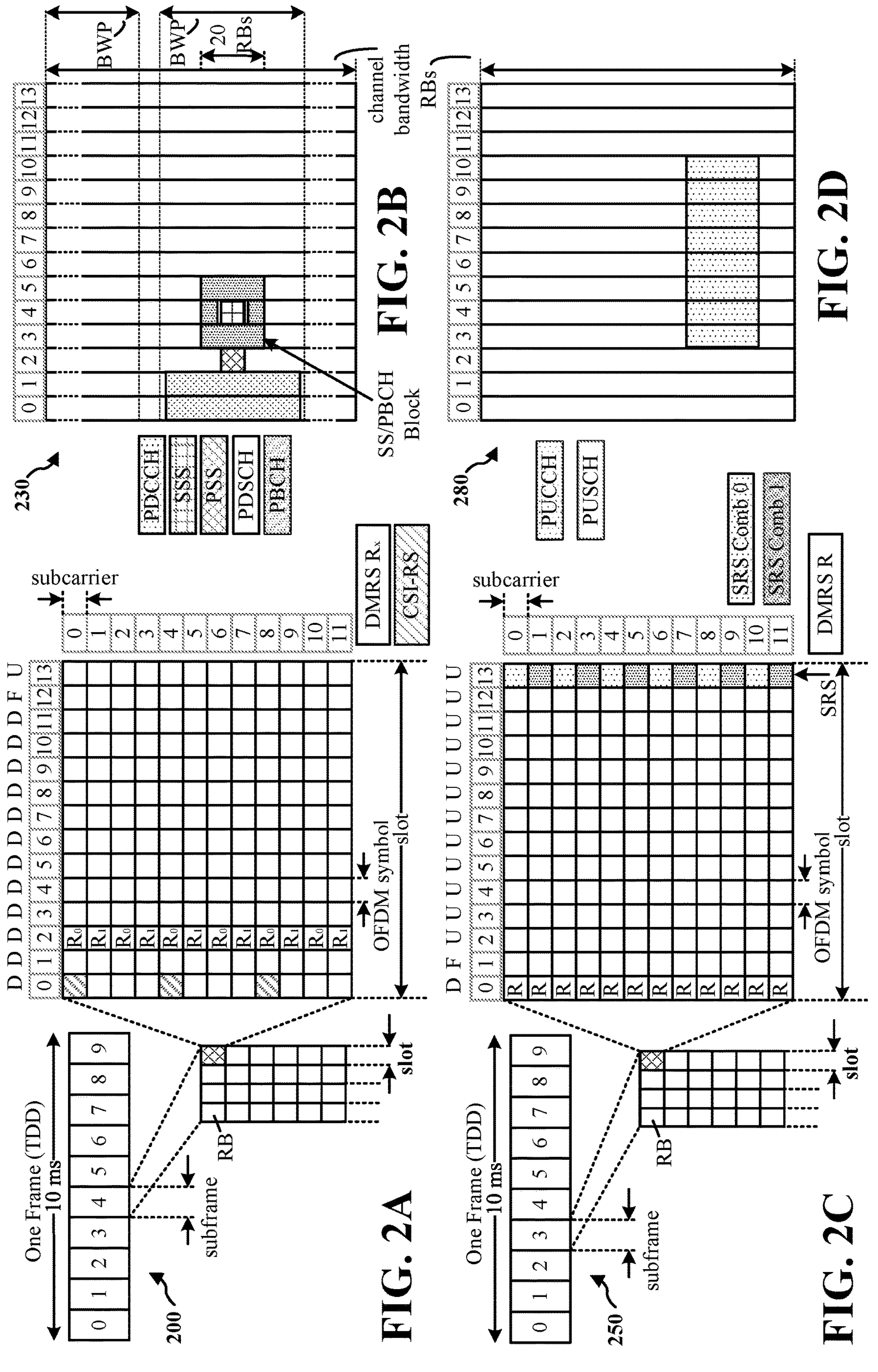
FIG. 2A is a diagram illustrating an example of a first frame, in accordance with various aspects of the present disclosure.
FIG. 2B is a diagram illustrating an example of downlink channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink channels within a subframe, in accordance with various aspects of the present disclosure.

FIG. 2A is a diagram illustrating an example of a first subframe 200 within a 5G NR frame structure. FIG. 2B is a diagram illustrating an example of downlink channels within a 5G NR subframe 230. FIG. 2C is a diagram illustrating an example of a second subframe 250 within a 5G NR frame structure. FIG. 2D is a diagram illustrating an example of uplink channels within a 5G NR subframe 280. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A and 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot signal, such as a reference signal (RS), for the UE. Broadly, RSs may be used for beam training and management, tracking and positioning, channel estimation, and/or other such purposes. In some configurations, an RS may include at least one demodulation RS (DM-RS) (indicated as Rx for one particular configuration, where 100x is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. A UE (such as a UE 104 of FIG. 1A) may use the PSS to determine subframe/symbol timing and a physical layer identity. A secondary synchronization signal (SSS) may be within symbol 4 of particular subframes of a frame. A UE (such as a UE 104 of FIG. 1A) may use the SSS to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the network device. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a network device for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), which may include a scheduling request (SR), a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
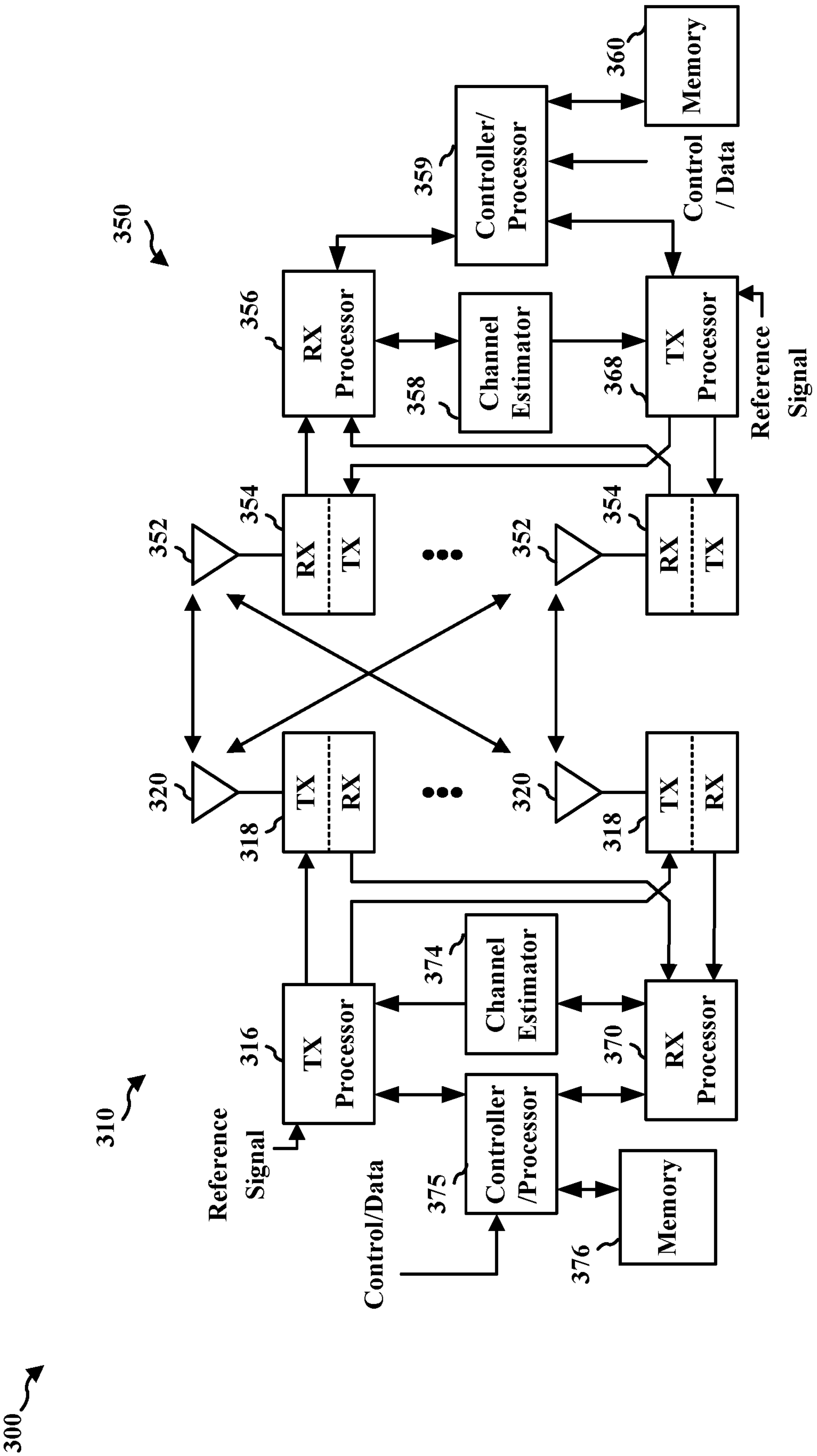
FIG. 3 is a diagram illustrating an example of a protocol architecture of a network device and user equipment (UE) in an access network.

FIG. 3 is a block diagram of a network device 310 in communication with a UE 350 in an access network 300. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through at least one respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the network device 310. These soft decisions may be based on channel estimates computed by the channel estimator 358. The soft decisions are then decoded and deinterleaved to recover the data and control signals that were originally transmitted by the network device 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the network device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the network device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the network device 310 in a manner similar to that described in connection with the receiver function at the UE 350. Each receiver 318RX receives a signal through at least one respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the coverage extension component 198 of FIG. 1A.

At least one of the TX processor 368, the RX processor 356, and the controller/processor 359 may be configured to perform aspects in connection with the coverage extension component 199 of FIG. 1A.

Figure 4:
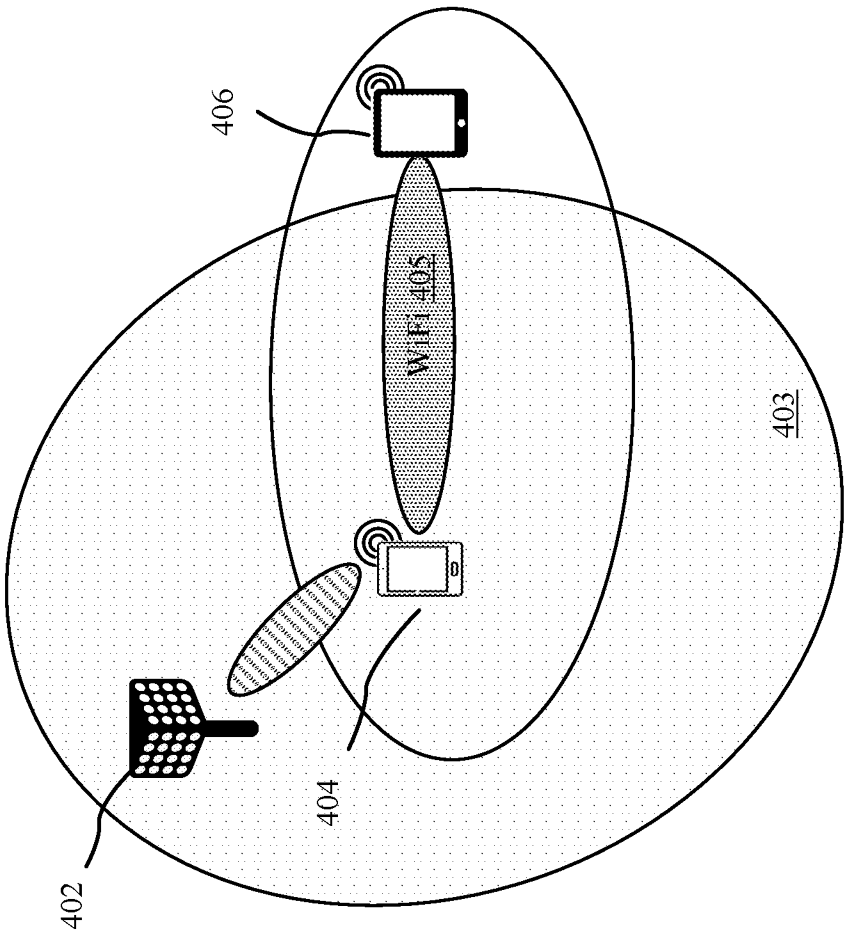
FIG. 4 is a diagram illustrating an example of coverage extension with a cooperative UE.

FIG. 4 illustrates an example 400 of coverage extension with a cooperative UE. In example 400, a transmission reception point (TRP) 402 of a network communicates directly with a cooperative UE 404 and an active target UE 406 is located outside a coverage area 403 of the TRP 402 or in a poor radio connection. Here, the cooperative UE 404 is acting as a proxy to the active target UE 406 since the active target UE 406 can still connect to the cooperative UE 404 via a non-3GPP link such as Wi-Fi 405. In some aspects, the cooperative UE 404 may be a mobile device or a static device such as a customer premise equipment (CPE). This entire process is transparent to the network since the network is unaware of the arrangement between the cooperative UE 404 and the active target UE 406. Instead, the active target UE 406 still appears to the 3GPP network as a target device while utilizing the hardware and software of the cooperative UE 404.

For instance, in example 400, active target UE 406 is out of the 3GPP network with a base station, but it would be helpful for the base station to connect with the active target UE 406. Since the active target UE 406 is out of network coverage with the base station, the target UE 406 cannot use the 5G or LTE network in this example. Instead, the active target UE 406 may use the cooperative UE 404 to act as a relay between the base station and the active target UE 406, where the base station may communicate with the cooperative UE using 5G/LTE, while the communication that is relayed to the target UE 406 may utilize a sidelink Wi-Fi link between the cooperative UE 404 and the target UE 406. Here, a non-3GPP sidelink technology such as Wi-Fi 405 is utilized rather than a 3GPP sidelink technology such as 5G, because even though both technologies may achieve the same result of communication between cooperative UE 404 and active target UE 406, the non-3GPP technology may provide more network transparency to a base station including TRP 402 than the 3GPP technology. For example, 5G sidelink is standardized but may still require coordination between the network and the devices according to a pre-configured agreement. For example, the UEs may communicate with the base station for sidelink resources or receive other configurations to communicate with each other over 5G sidelink. However, with Wi-Fi or other non-3GPP technology, such coordination may not be required and the devices may coordinate with each other without network involvement or otherwise transparently to the network. This allows the UEs to associate with each other, discover each other, etc. independently of the base station using Wi-Fi or other non-3GPP protocols and the base station may communicate with the target UE through transparent reliance on the cooperative UE.

Generally, keys are exchanged between the TRP 402 and a UE in coverage area 403 to allow both devices the ability to cipher/decipher data. However, here, cooperative UE 404 is present, and although cooperative UE 404 may not be involved in communications between the TRP 402 and other UEs within coverage area 403, cooperative UE 404 is involved in the communication between the TRP 402 and the target UE 406. For instance, the target UE 406 may use the hardware and software of the cooperative UE 404 to relay messages to and from the TRP 402. Thus, non-3GPP link such as Wi-Fi 405 may be provided so that cooperative UE 404 may relay communications between the base station and the target UE in a way that is transparent to the network. Moreover, active target UE 406 may not exchange its derived user plane keys with the cooperative UE 404. As a result, that cooperative UE may not decipher user data communicated between TRP 402 and active target UE 406. However, active target UE 406 may provide its derived control plane or RRC keys with the cooperative UE 404 for cooperative UE 404 to utilize in radio resource management (RRM).

Figure 5:
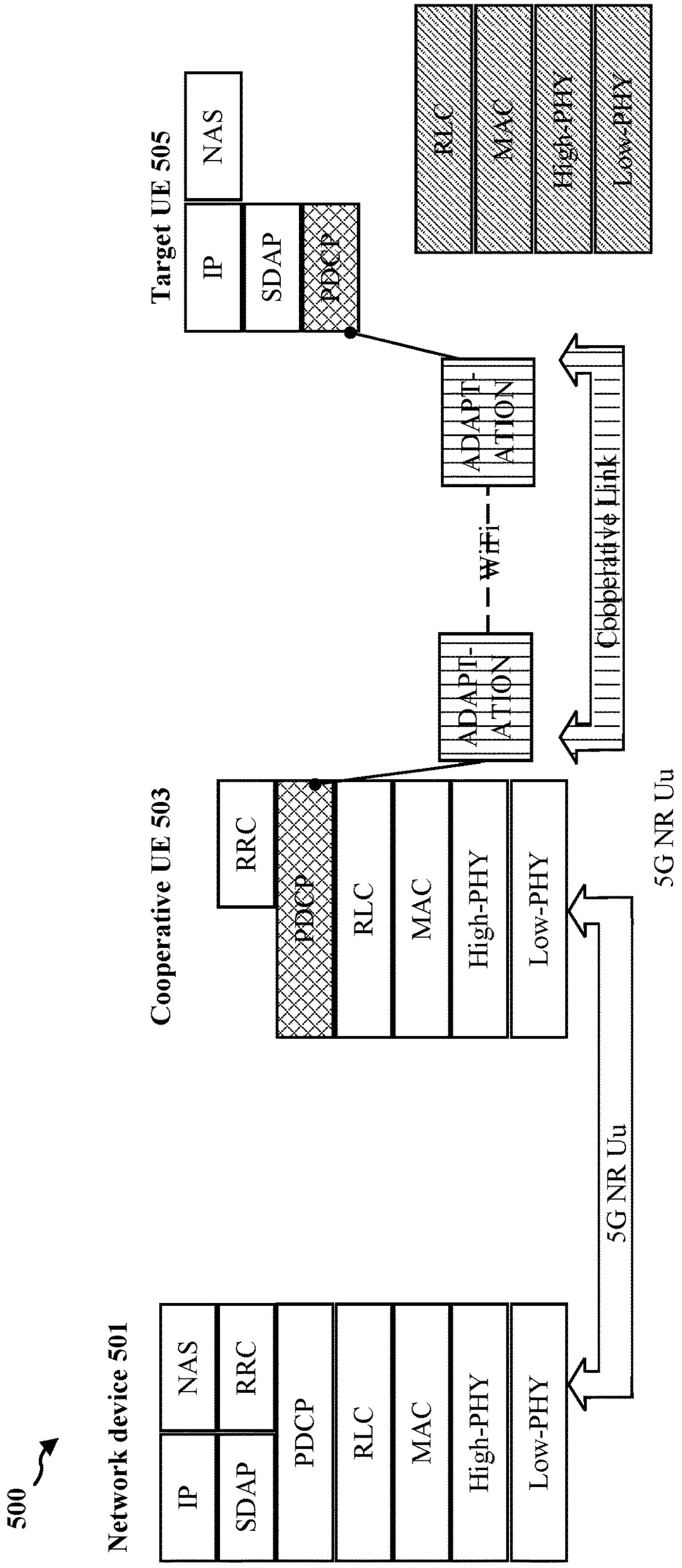
FIG. 5 is a diagram illustrating an example of a protocol architecture for wireless communication.

FIG. 5 illustrates an example of a protocol architecture of a network device and user equipment (UE) in an access network. As shown in example 500, aspects of the present disclosure leverage a functional split at a cooperative UE 503 in processing user plane data from network device 501 or target UE 505, such as a PDCP layer split or a split between PDCP and RLC layers as defined by 3GPP, while leveraging the RRC layer of the cooperative UE in processing control plane data from the network device 501 or target UE 505. For instance, the cooperative UE 503 may perform PDCP reordering of downlink data before it is sent to the target UE 505, which target UE 505 maintains user plane security by privately maintaining its associated user plane keys used in deciphering downlink and ciphering uplink data. The cooperative UE 503 may maintain control plane security by receiving associated RRC keys from the target UE 505 and using these keys to decipher downlink data for RRM processing and ciphering RRM messages for uplink transmission.

As previously described, the target UE 505 may not share its user plane keys with the cooperative UE 503. Otherwise, the cooperative UE 503 may determine how to interpret the data that the target UE 505 is receiving or transmitting, leading possibly to privacy concerns and possibly additional limitations on which devices may cooperate with each other. By refraining from sharing the user plane keys with the cooperative UE 503 such that the cooperative UE 503 cannot read the data it is relaying between the network device 501 and the target UE 505, then no restriction on the cooperative between devices may be achieved. Instead, the target UE 505 may safely rely on the cooperative UE 503 to help with data traffic and without any concern about the cooperative UE 503 reading its messages as a bad faith actor.

The credentials used for communicating between the network device 501 and the target UE 505 for the user plane are the target UE credentials, which are known at the target UE 505. However, for the control plane, the target UE 505 provides those credentials/keys to the cooperative UE 503 such that the cooperative UE 503 can handle RRC messages with the network device 501. The network device 501 ciphers and integrity protects downlink data, and the target UE 505 integrity protects uplink data, at the request of the network device 501 using the derived key of the target UE 505 since the cooperative UE 503 gets the data from the target UE 505. However, the target UE 505 does not provide the data/user plane keys since those keys are private at the target UE 505 and not exchanged.

There are two planes of communication between a transmitter (Tx) and a receiver (Rx). One is the data plane and the other is the control plane. The control plane is used to control management of the radio interface when there should be a change in parameters and configurations. However, the control plane does not include data that is useful to an end user. Instead, the data plane includes data useful to the end user.

In order to enable a transparent mode of cooperative communications, an exchange of the control plane keys should occur, but the data keys should be kept at the target UE 505. This way the target UE 505 is not comprised because it is security protected such that the cooperative UE 503 cannot look at the data and interpret it in any way.

To enable this cooperation, there is an exchange of keys used to decipher, integrity check, authenticate, etc. for the control plane information, but not the user plane information. There are two different types of keys derived from a same root key. At least one key is derived for the control plane and at least one key is derived for the user plane. The key used for user plane ciphering and deciphering may not be provided to cooperative UE 503 by the target UE 505, while the one used for control plane may be provided to cooperative UE 503 by the target UE 505. For either plane, the target UE 505 may derive the keys since it is the device controlling the keys and it provides the control plane key to the cooperative UE 503. Accordingly, the cooperative UE 503 may have the derived key for the control plane, but cannot determine whether the root key is based on the derived key since that may be difficult due to computational limitations. This means that the target UE 505 is in control of providing derived keys for the control plane and, when the key is supposed to change, the cooperative UE 503 relies on the target UE 505 to figure out the new derived key and provide the new key to the cooperative UE 503.

The end points of the communication links use the keys to cipher data or add integrity protection so the other side can decipher or check whether the data is correct. But the cooperative UE 503 does not receive these keys for user plane data since the cooperative UE 503 is simply acting as a relay between the end points. In contrast, for control plane data, the cooperative UE 503 receives these keys because it is also handling RRM messages so the cooperative UE 503 may decipher data when received and cipher data when transmitting. Relying on the target UE 505 for RRM would add some unaffordable delays in the control plane so, instead, the target UE 505 gives the keys to the cooperative UE 503. However, for user plane data, the cooperative UE 503 may not interpret any data since it is just relaying the bits to the target UE, which deciphers them in the DL and ciphers them in the UL. This allows the user plane data to not be interpretable by the cooperative UE 503.

Figure 6:
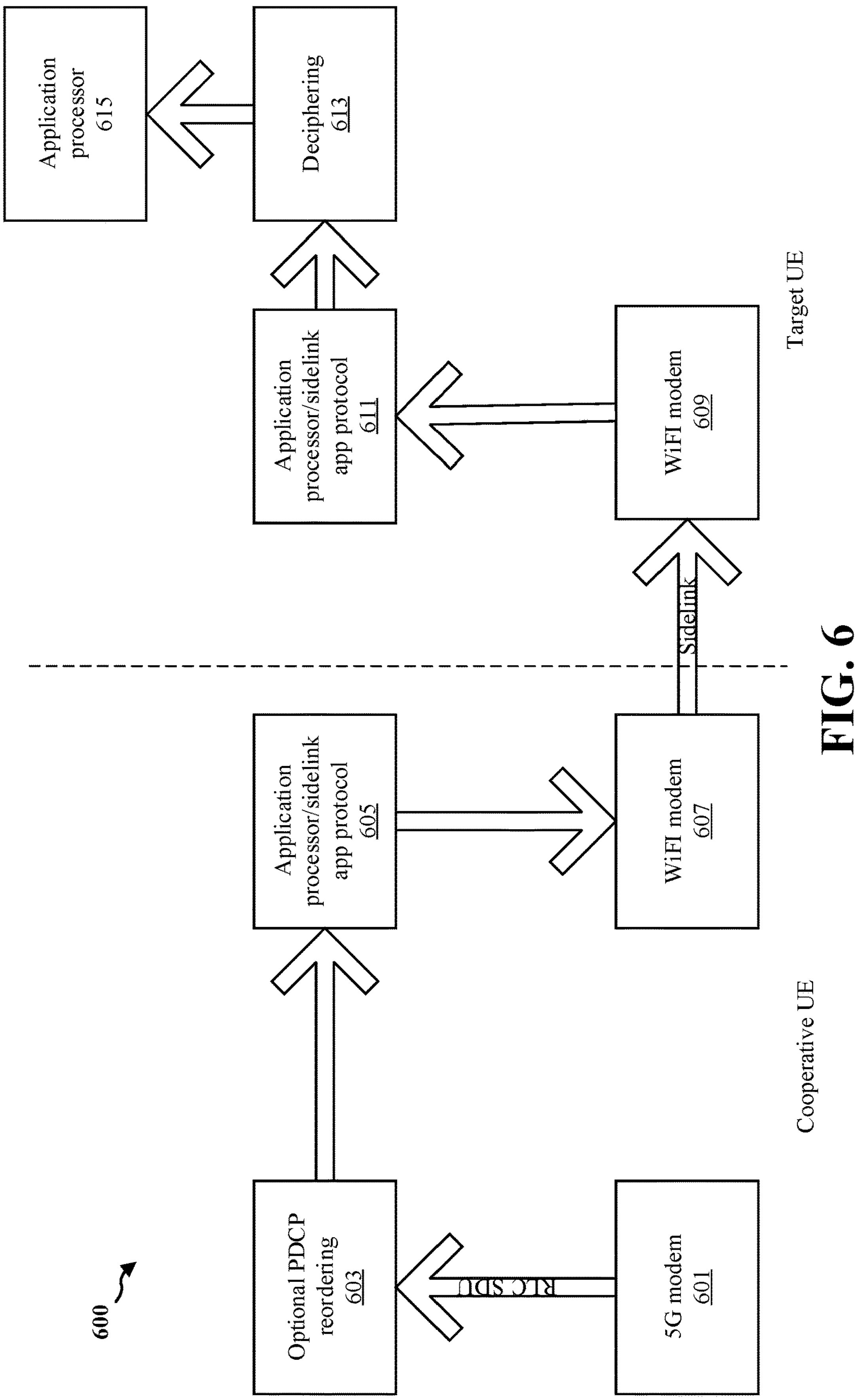
FIG. 6 illustrates an example flowchart illustrating a method of downlink (DL) data transfer for wireless communication.

FIG. 6 illustrates an example flowchart illustrating a method of downlink (DL) data transfer for wireless communication. Here, example 600 shows how user plane data communication works in the DL direction. The cooperative UE decodes data up to the PDCP layer. When the data needs to be deciphered, the data is sent to the target UE via sidelink or Wi-Fi.

The 5G modem 601 of the cooperative UE transmits data via its modem downlink data which goes to the upper layers until the RLC layer. The RLC layer will send a service data unit (SDU) to the PDCP layer, which will perform an optional PDCP reordering 603 and then the optionally reordered packets will be sent to an application processor 605. At this point, the data will be transferred from the 5G protocol stack to the sidelink Wi-Fi protocol stack where it heads back down the layers to the Wi-Fi modem 607 of the cooperative UE where it is signaled (via OFDM) to the Wi-Fi modem 609 of the target UE using Wi-Fi protocols.

The target UE will receive the message and move it up its Wi-Fi protocol stack through the upper layers to the application processor 611, at which point the data will be transferred from the Wi-Fi stack to the 5G stack (e.g., specifically the PDCP layer), where the data is deciphered 613 and then moved up to the IP layer to be processed by the application processor 615. In example 600, no deciphering or ciphering is performed by the cooperative UE since it does not have the derived keys of the target UE for user plane data. Instead, the cooperative UE just transfers the data bits as is to the target UE.

Figure 7:
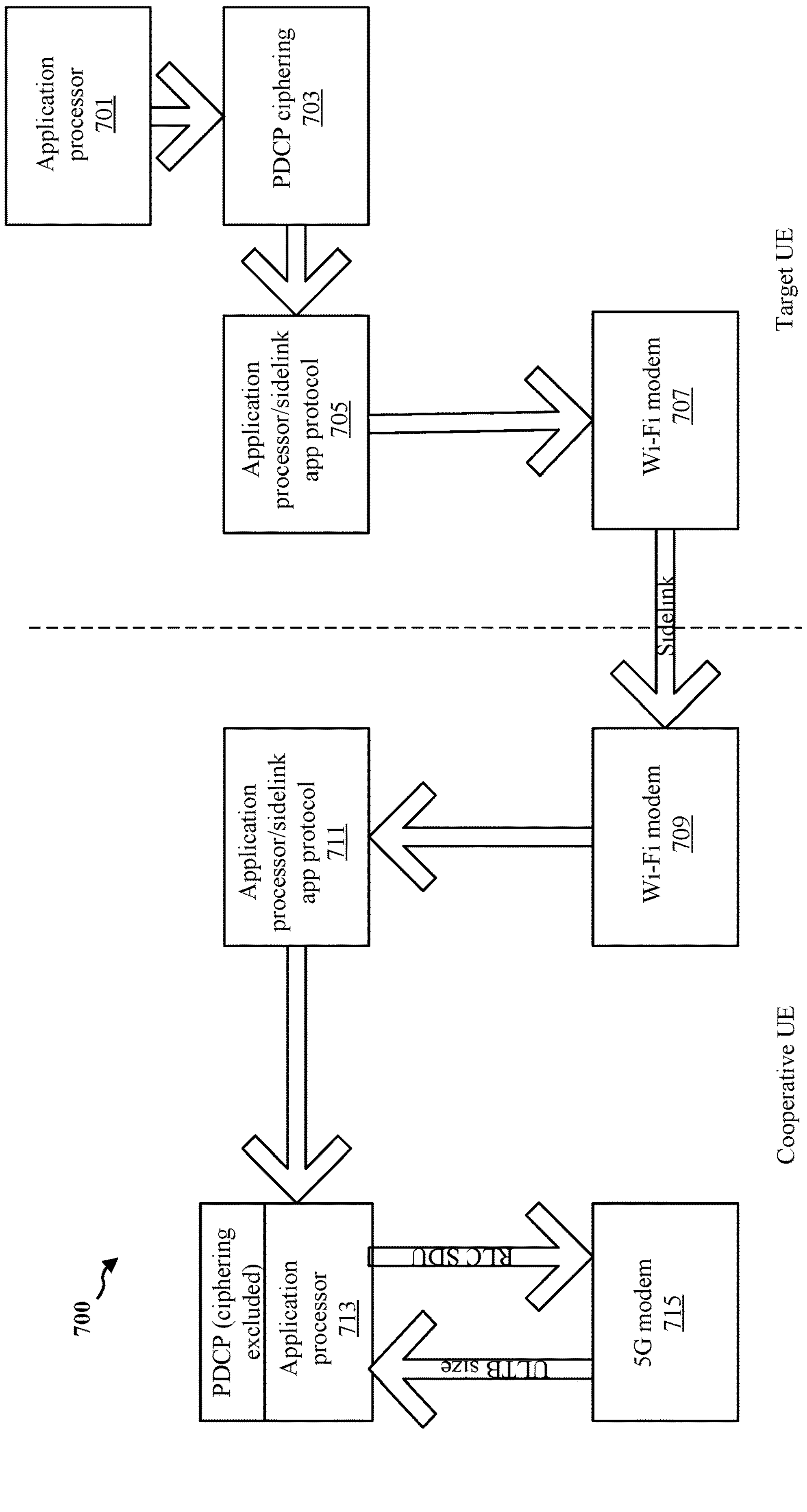
FIG. 7 illustrates an example flowchart illustrating a method of uplink (UL) data transfer for wireless communication.

FIG. 7 illustrates an example flowchart illustrating a method of uplink (UL) data transfer for wireless communication. In contrast to example 600 in FIG. 6, example 700 shows how user plane data communication works in the UL direction. For instance, PDCP ciphering is performed at the target UE and the ciphered data is sent to the cooperative UE. The cooperative UE simply sends ciphered data to the network through the 5G modem.

Here, the application processor 701 transmits data for PDCP ciphering 703 and sends the ciphered data to the application processor 705. At this point, the data will be transferred to the Wi-Fi modem 707 of the target UE and signaled (via OFDM) to the Wi-Fi modem 709 of the cooperative UE using Wi-Fi protocols.

The cooperative UE receives the message and moves it up 5G protocol stack to the application processor 711, at which point the data will be transferred from the Wi-Fi stack to the 5G stack (e.g., specifically the PDCP layer), where the data is transmitted to the application processor 713 for communication with the 5G modem 715.

Figure 8:
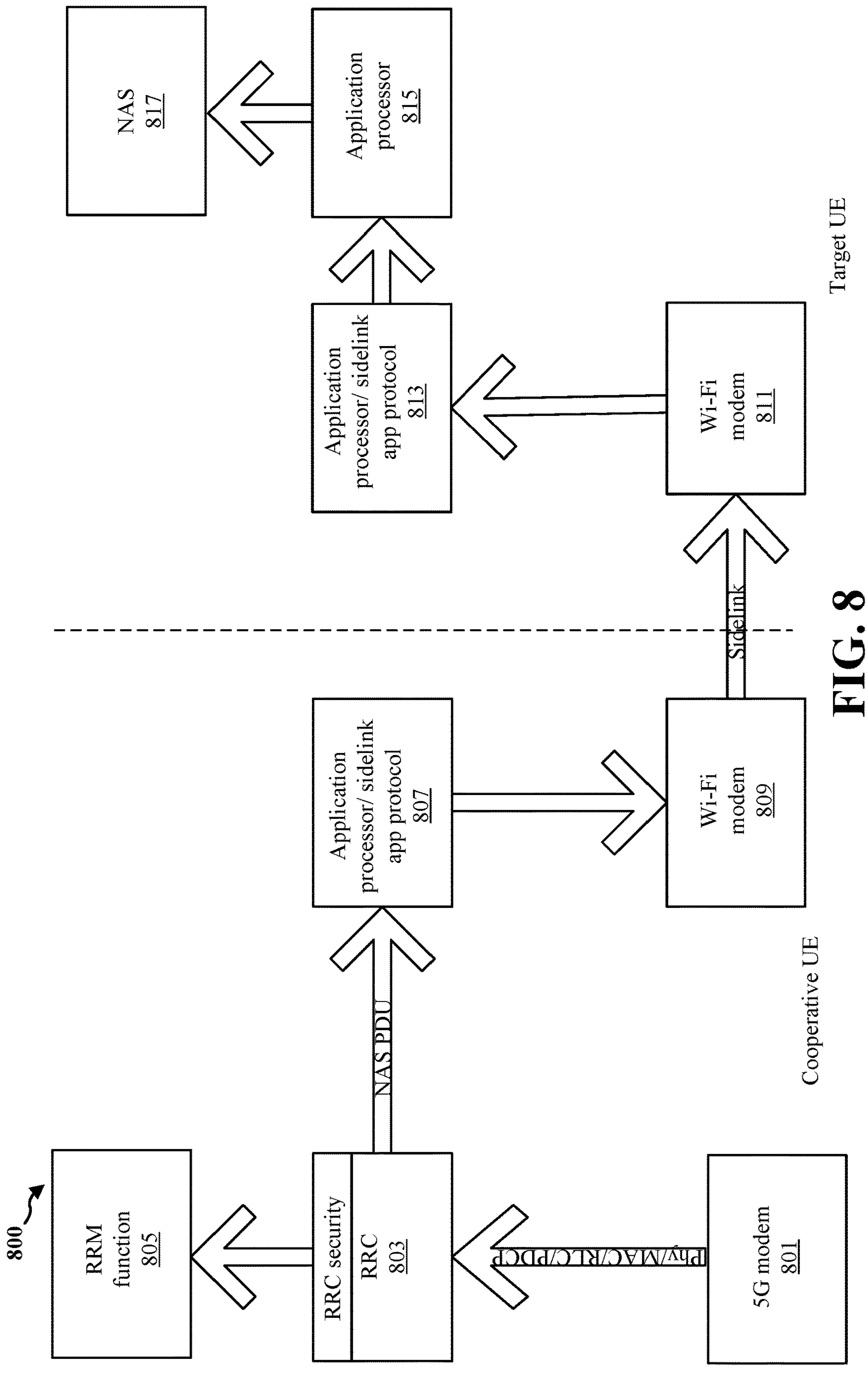
FIG. 8 illustrates an example flowchart illustrating a method of DL data transfer for wireless communication.

FIG. 8 illustrates an example flowchart illustrating a method of DL data transfer for wireless communication. Specifically, example 800 shows control plane communication in the downlink direction. In contrast to example 600 from FIG. 6 and example 700 from FIG. 7, example 800 shows a cooperative UE with a radio resource management (RRM) function and the target UE has a non-access stratum (NAS) function. Example 800 shows that RRM processing (e.g., anything radio related) is performed at the cooperative UE side and anything non-radio related is performed at the target UE side.

Here, the cooperative UE receives, via downlink, control data from the 5G modem 801 which goes to the upper layers until the RRC layer 803. The RRC layer 803 will decipher the data using the control plane keys of the target UE and perform a RRM function 805 on the deciphered data.

Moreover, the ciphered data will be sent to an application processor 807 at which point the data will be transferred from the 5G protocol stack to the sidelink Wi-Fi protocol stack where it heads back down the layers to the Wi-Fi modem 809 of the cooperative UE where it is signaled (e.g., via OFDM) to the Wi-Fi modem 811 of the target UE using Wi-Fi protocols. The target UE will receive the message and move it up its Wi-Fi protocol stack through the upper layers to the application processor 813, at which point the data will be transferred from the Wi-Fi stack to the 5G stack (e.g., specifically, the application processor 815), where it is moved up the NAS layer to be processed 817.

Figure 9:
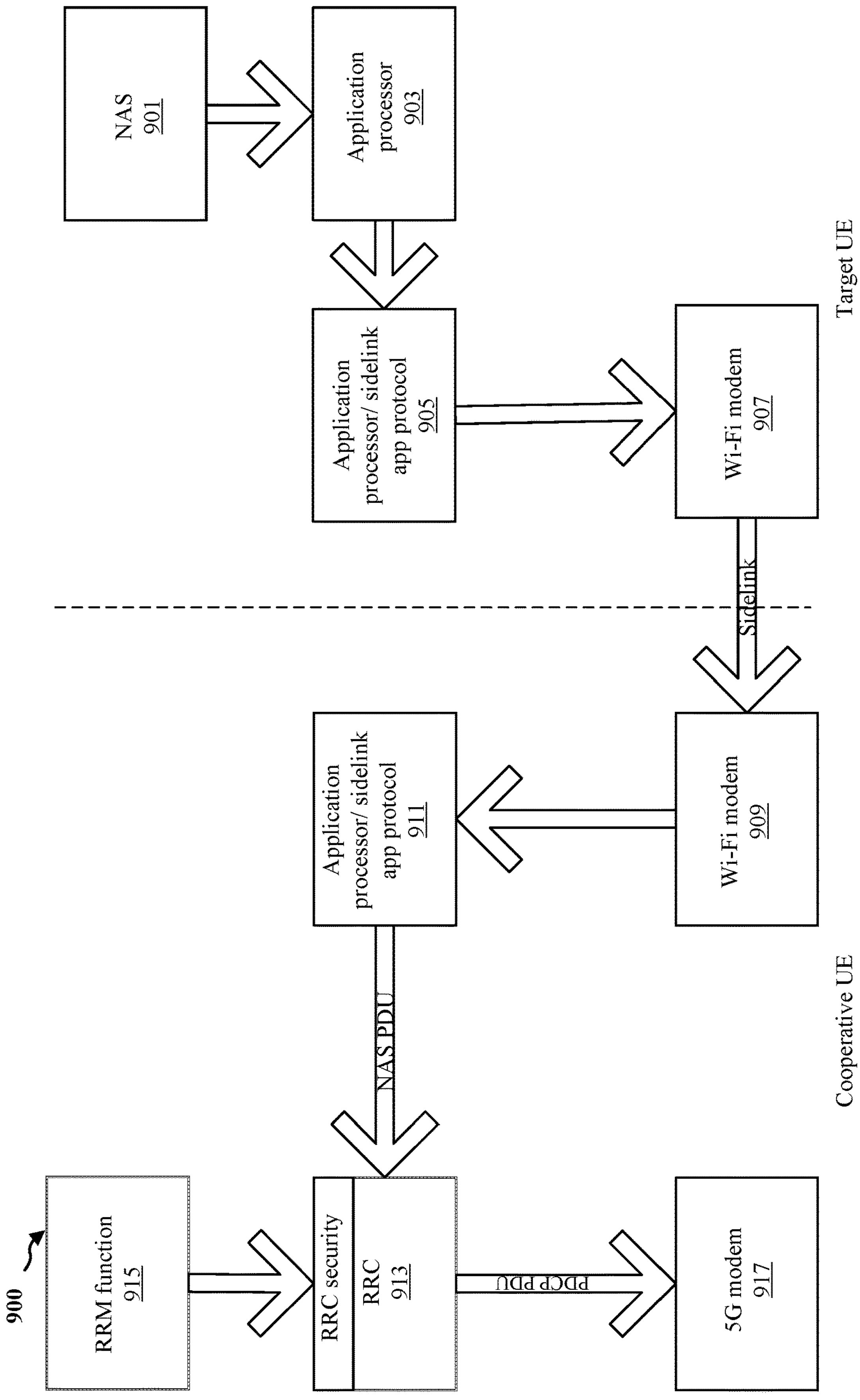
FIG. 9 illustrates an example flowchart illustrating a method of UL data transfer for wireless communication.

FIG. 9 illustrates an example flowchart illustrating a method of UL data transfer for wireless communication. Specifically, example 900 shows control plane communication in the uplink direction. The NAS message 901 originating from the target UE is sent as data to the cooperative UE while the RRM function 915 is autonomous at the cooperative UE. The cooperative UE will also apply RRM in its RRM function 915 to determine whether any changes should be made to the link with the target UE and cipher the RRC message at the RRC layer with the control plane keys from the target UE. Similar to example 800 in FIG. 8, the functional split shows that RRM processing (e.g., anything radio related) is performed at the cooperative UE and anything non-radio related is performed at the target UE.

A NAS message 901 is transmitted from the 5G stack (e.g., specifically, the application processor) 903 to the Wi-Fi protocol stack through upper layers of the application processor 905 to the Wi-Fi modem 907 of the target UE. The data is transferred from the layers of the Wi-Fi modem 907 of the target UE to the Wi-Fi modem 909 of the cooperative UE using Wi-Fi protocols. The data is sent to the upper layers of the application processor 911 to the upper layers of the RRC layer 913. A RRM function 915 is performed on the data, which is received by the 5G modem 917 of the cooperative UE receives, via its modem downlink.

Figure 10:
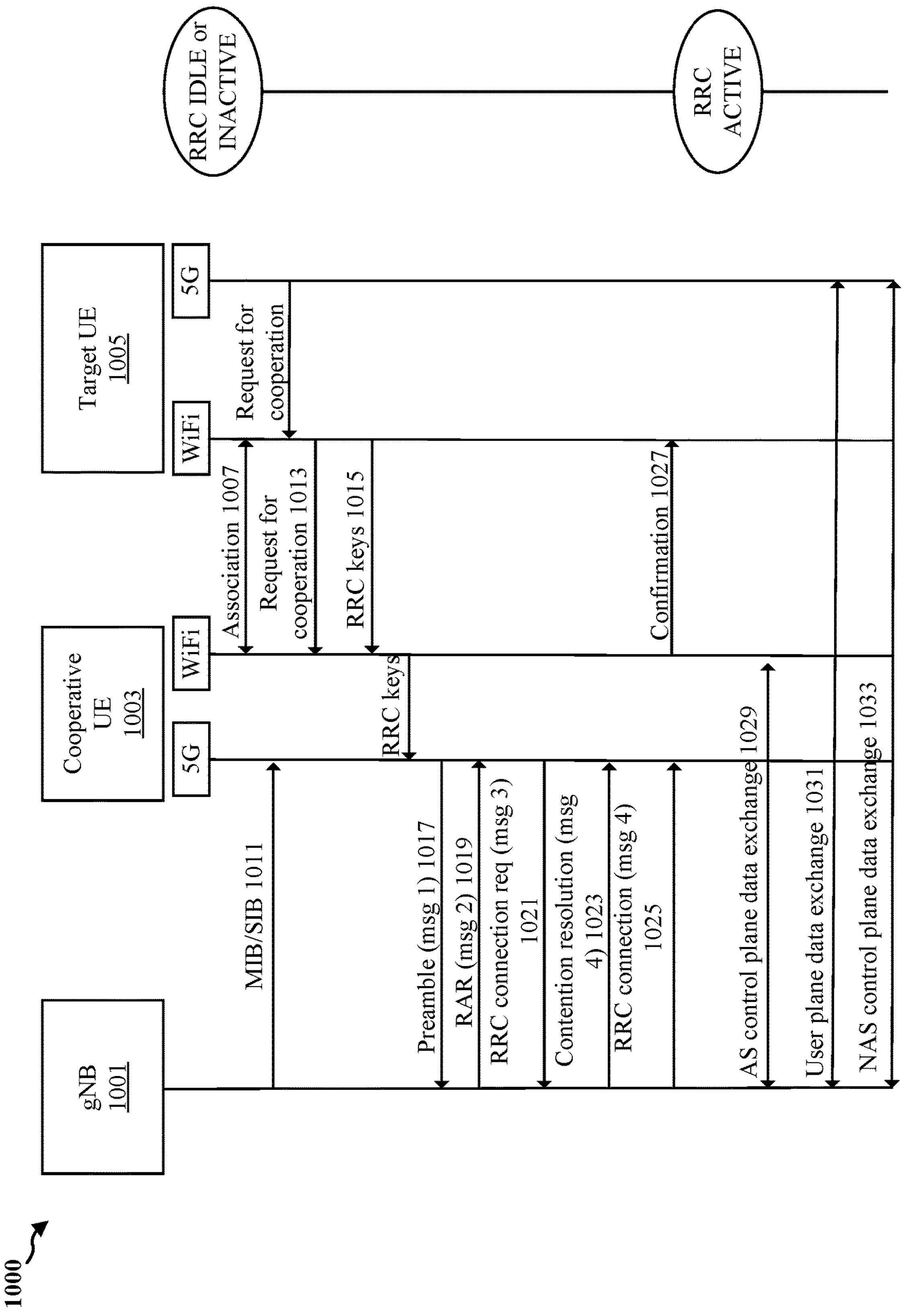
FIG. 10 illustrates a call flow diagram between a network entity, an apparatus, and a UE.

FIG. 10 is a call flow diagram 1000 between a base station 1001, a cooperative UE 1003, and a target UE 1005. A call flow 1000 illustrates an exemplary sequence of operations performed between the base station 1001 and the target UE 1005 by using the cooperative UE 1003 to extend coverage. For example, call flow 1000 depicts operations for setting up cooperation by requesting activation of cooperation communications and performing a RRC key exchange. It is understood that one or more of the operations described in call flow 1000 may be performed earlier or later in the process, omitted, replaced, supplemented, or combined with another operation. Also, additional operations described herein that are not included in call flow 1000 may be included in call flow 1000.

For the target UE 1005 to benefit from cooperative communications with the base station 1001 via the cooperative UE 1003, the target UE 1005 first conducts an association process 1007 with the cooperative UE 1003, and then sends a request for cooperation command 1013 via Wi-Fi to the cooperative UE 1003. The base station 1001 may transmit broadcast information 1011 such as a master information block (MIB) and system information block (SIB) to the cooperative UE 1003. The request for cooperation 1013 may come from the target UE 1005 because, generally, the target UE 1005 is the device that determines to cooperate. In some aspects, the request from cooperation may come from the cooperative UE 1003.

The cooperative UE 1003 receives the request for cooperation 1013 on a Wi-Fi link from the target UE 1005. The target UE 1005 then sends derived RRC keys 1015 (the control plane keys) to the cooperative UE 1003 so the cooperative UE 1003 can access the network 1001 using 3GPP procedures.

Conducting these operations is performed using new protocol implementations, while the messages transmission themselves may be performed via Wi-Fi at a higher layer protocol in a control plane for these cooperative communications. After sending the request for cooperation 1013 (in either cases whether it receives or waits for acknowledgement or not), the target UE 1005 derives its RRC keys and sends the derived RRC keys 1015 to the cooperative UE 1009. The cooperative UE will not send the keys to the base station. Instead, after connecting to the network via a RACH procedure and sending a confirmation message 1027 to the target UE 1005 that cooperative communications using the RRC keys has begun, it will use those keys when it ciphers and deciphers control information communicated between the base station 1001 and the target UE 1005 for RRM purposes.

As seen in FIG. 10, a typical RACH procedure may involve four transmissions. First, the cooperative UE may transmit Message 1 1017 on the physical random access channel (PRACH). The Message 1 transmission is a first transmission that may include a PRACH preamble, including timing information for uplink transmissions that allow the base station to set timing advance parameters, for example. In response to receiving Message 1, the base station 1001 may transmit a Message 2 transmission 1019 on the PDCCH or PDSCH. The Message 2 transmission may also be referred to as a random access response (RAR) message, and the contents may include timing advance parameters or information, an uplink grant for the UE's Message 3 transmission on the uplink 1021, a temporary cell radio network temporary identifier (TC-RNTI), and the like. In some instances, the TC-RNTI may be sent to the UE to indicate the scrambling sequence used for Message 4 transmission. The base station 1001 sends a contention resolution message 1023 to the cooperative UE 1003 and, the base station 1001 sends a RRC configuration 1025 to the cooperative UE 1003.

Once the link is established, the cooperative UE 1003 transmits confirmation message 1027 to the target UE 1005 on the Wi-Fi link. At this point the RRC is active and the target UE 1005 can begin exchanging user plane data 1031 and NAS control plane data 1033 with the base station 1001 using the access stratum (AS) control plane data 1029 with the cooperative UE 1003.

Communication of control plane data from the base station 1001 to the cooperative UE (as well as from the target UE to the cooperative UE) 1033 will terminate at the RRC layer of the cooperative UE, while the PDCP layer of the target UE 1005 will cipher and decipher user plane data sent or received from the cooperative UE 1003.

It should be understood that the specific messages and the number of repetitions used in call flow 1000 diagram is non-limiting should be illustrative only.

Figure 11:
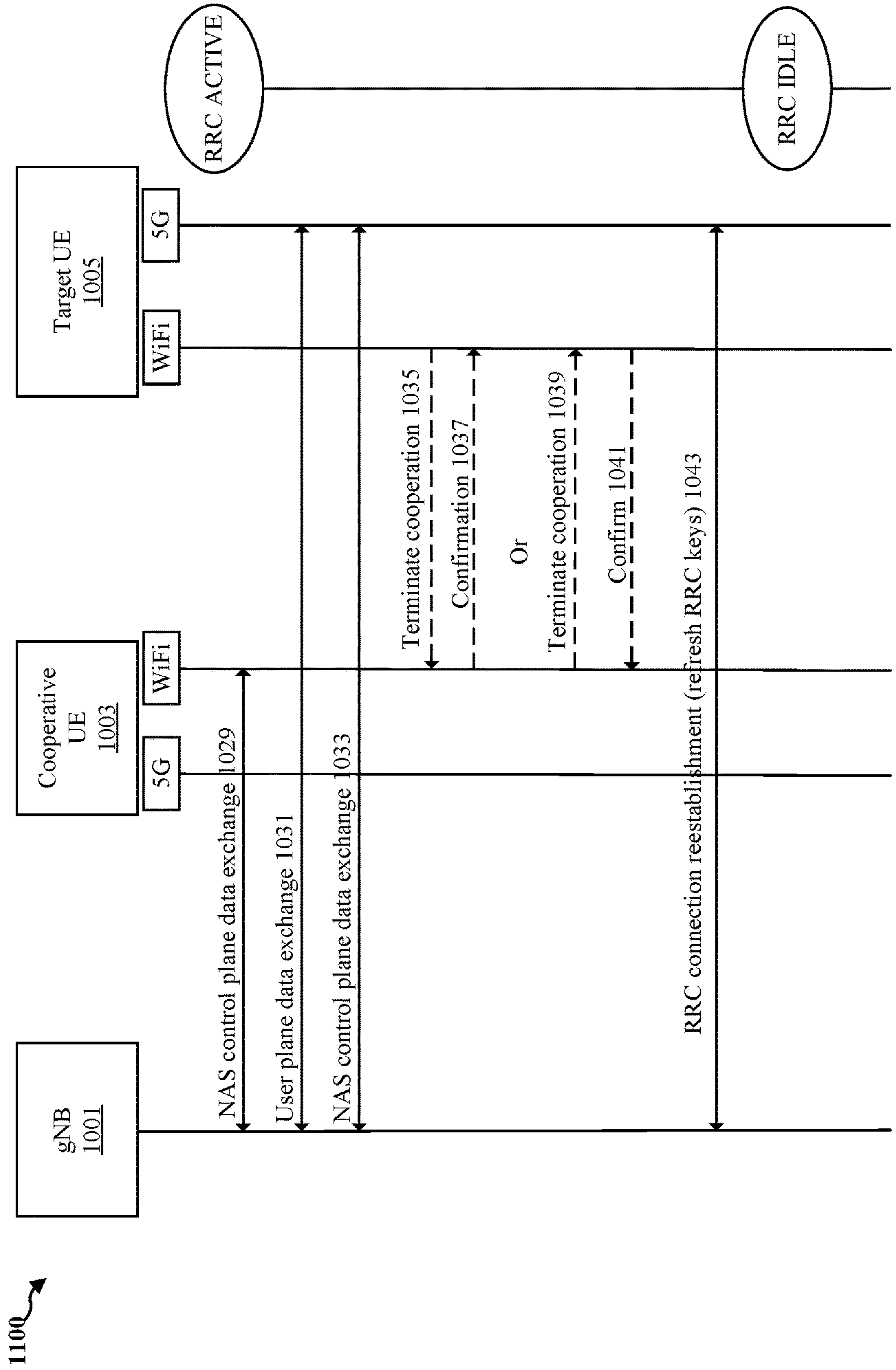
FIG. 11 illustrates a call flow diagram between a network entity, an apparatus, and a UE.

FIG. 11 is a call flow diagram 1100 between the base station 1001, the cooperative UE 1003, and the target UE 1005. A call flow 1100 illustrates an exemplary sequence of operations performed between the base station 1001 and the target UE 1005 by using the cooperative UE 1003 to extend coverage. For example, call flow diagram 1100 depicts operations for terminating cooperative UE 1003 and the target UE 1005 subsequently updating its RRC keys after the RRC is active. It is understood that one or more of the operations described in call flow 1100 may be performed earlier or later in the process, omitted, replaced, supplemented, or combined with another operation. Also, additional operations described herein that are not included in call flow 1100 may be included in call flow 1100. In the call flow 1100, operations 1029, 1031, and 1033 are performed as described above in connection with FIG. 10.

After the target UE 1005 shares its derived keys (RRC keys) with the cooperative UE 1003 to participate in the cooperative process, either the target UE 1005 or the cooperative UE 1003 may determine to no longer participate and will send a terminate cooperation message 1031, and 1035 to the other device. Some reasons UEs may determine to no longer participate include if the target UE 1005 moves into network coverage or if the cooperative UE 1003 determines there is no benefit to cooperate with the target UE 1005 due to monetary, traffic, or power concerns.

As shown in call flow 1100, the target UE 1005 may termination cooperation 1031 at any time and the cooperative UE 1003 may confirm the termination 1037. In some aspects, the cooperative UE 1003 can terminate the cooperation 1039 at any time and the target UE 1005 may confirm the termination 1041.

In response to confirming the other UE's request for cooperation, the cooperative UE 1003 will inform the base station 1001 of this termination (not shown). Subsequently, the base station 1001 will send a RRC reestablishment message 1043 to the target UE 1005 via the cooperative UE 1003. During the RRC connection reestablishment procedure, the target UE 1005 will refresh its derived keys and the cooperative UE 1003 will remain with the invalid prior RRC key of the target UE 1005 following the refresh. Since the key is refreshed, the cooperative UE 1003 can no longer use the old RRC key to manage the control plane. This allows the target UE 1005 to control which device to cooperate with at any time.

The target UE 1005 may continue to periodically refresh its keys for security purposes until it determines it wants to participate again in the process. In the meanwhile, the target UE 1005 may move into and out of the network coverage so it can always use its new derived keys whenever it wants. When the target UE 1005 wants to cooperate again, it may send a request for cooperation to the same cooperative UE 1003 or a different cooperative UE followed by the new keys.

It should be understood that the specific messages and the number of repetitions used in call flow 1100 diagram is non-limiting should be illustrative only.

Figure 12:
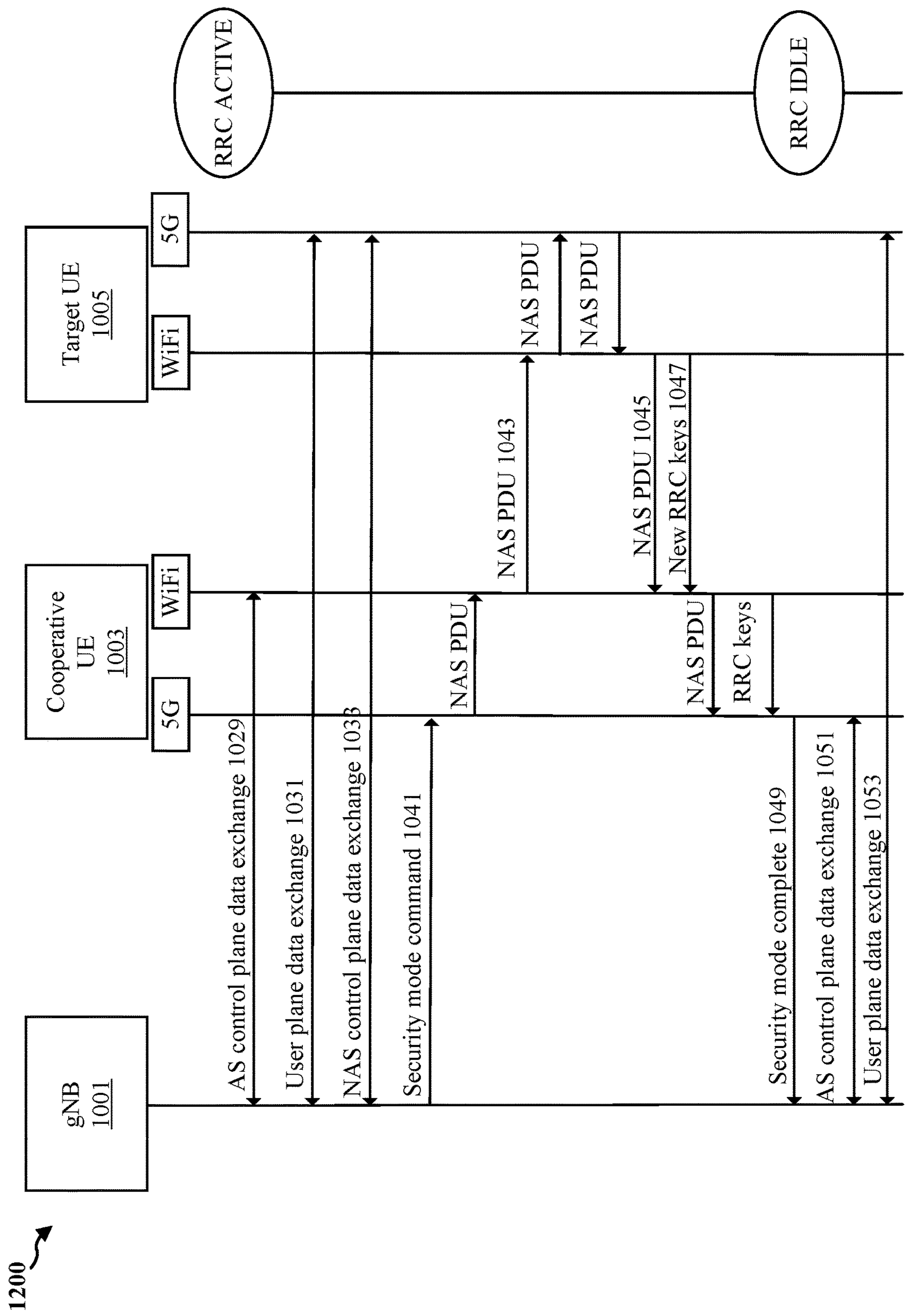
FIG. 12 illustrates a call flow diagram between a network entity, an apparatus, and a UE.

FIG. 12 is a call flow diagram 1200 between base station 1001, cooperative UE 1003, and target UE 1005. A call flow 1200 illustrates an exemplary sequence of operations performed between the base station 1001 and the target UE 1005 by using the cooperative UE 1003 to extend coverage. For example, call flow diagram 1200 depicts operations for updating RRC keys. It is understood that one or more of the operations described in call flow 1200 may be performed earlier or later in the process, omitted, replaced, supplemented, or combined with another operation. Also, additional operations described herein that are not included in call flow 1200 may be included in call flow 1200. In the call flow 1200, operations 1029, 1031, and operation 1033 are performed as described above in connection with FIG. 10.

While communicating in the cooperative approach, there may be a regular key update procedure to prevent keys from becoming stale and vulnerable to security attacks.

During this cooperative session, when a key update procedure occurs, the base station 1001 may send a security mode command 1041 to the cooperative UE 1003. This NAS PDU message 1043 is forwarded to the target UE 1005 to process, which in turn creates a NAS message 1045 to be sent back to the base station 1001.

At the same time, the target UE 1005 provides new RRC keys 1047 to the cooperative UE 1003 in response to the NAS PDU 1043 and sends the NAS RRC keys 1047 response back to the network as data. The RRC keys are not sent to the network 1001 but merely exchanged between the Wi-Fi and the 5G part of the modem of the cooperative UE 1003. The NAS PDU message 1045 which is part of the security mode complete 1049 is sent back to the base station 1001.

Moreover, the target UE 1005 may also provide a security mode complete 1049 NAS PDU to the cooperative UE 1003, which in turn may forward it to the base station. Following this procedure, the AS control data exchange 1051 and the user plane data exchange 1053 may continue in the non 3-GPP link as previously discussed.

It should be understood that the specific messages and the number of repetitions used in call flow 1200 diagram is non-limiting should be illustrative only.

Figure 13:
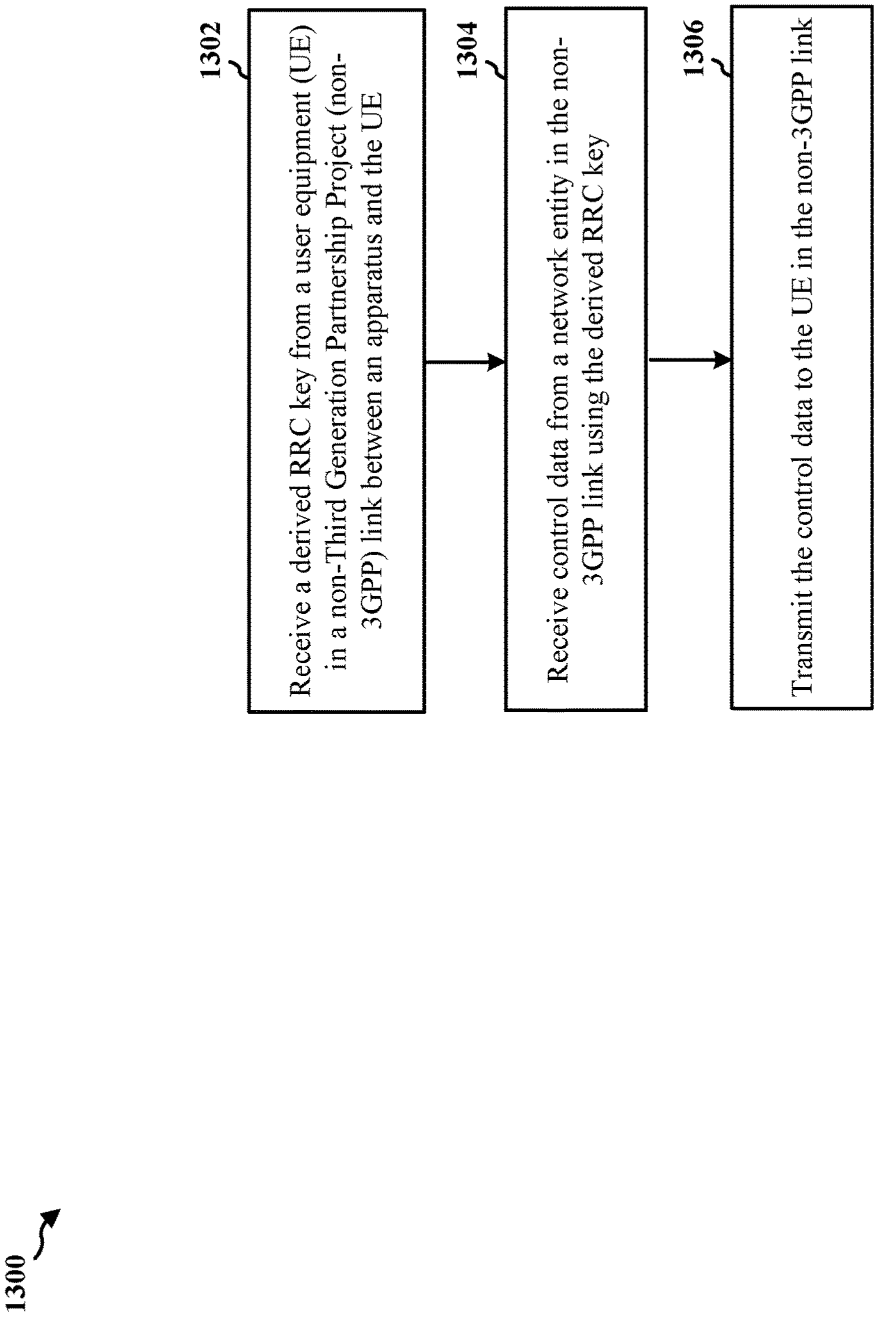
FIGS. 13-16 illustrate example flowcharts illustrating a method of wireless communication at a cooperative UE.

FIG. 13 is a flow chart of a method 1300 of wireless communication at a cooperative UE. The method 1300 may be performed by or at a UE (e.g., the UE 104, 350, 404, 503, 1003), another wireless communications apparatus (e.g., the apparatus 2202), or one or more components thereof. According to various different aspects, one or more of the illustrated methods 1300 may be omitted, transposed, and/or contemporaneously performed. The method 1300 allows for providing coverage extension to a target UE.

The method 1300 may be performed by an apparatus, such as a coverage extension component 198, as described above. In some implementations, the method 1300 is performed by processing logic, including hardware, firmware, software, or a combination thereof. In some implementations, the method 1300 is performed by a processor executing code stored in a non-transitory computer-readable medium (e.g., a memory).

At operation 1302, the apparatus may be configured to receive a derived radio resource control (RRC) key from a user equipment (UE) in a non-Third Generation Partnership Project (non-3GPP) link between the apparatus and the UE. For example, referring back to FIG. 10, the cooperative UE 1003 may receive RRC keys 1015 from the target UE 1005. In some aspects, the non-3GPP link may correspond to a Wi-Fi link. In some aspects, the apparatus may be a UE. For example, referring back to FIG. 4, the apparatus may be the cooperative UE 404, the UE may be the target UE 406, the non-3GPP link may correspond to a Wi-Fi link 405, and the 3GPP link may refer to a 5G network 403. In some aspects, the UE is out of coverage of a network entity in a 3GPP link with the apparatus. For example, referring back to FIG. 4, a transmission reception point (TRP) 402 of a network communicates directly with a cooperative UE 404 and an active target UE 406 is located outside a coverage area 403 of the TRP 402 or in a poor radio connection.

At operation 1304, the apparatus may also be configured to receive control data from the network entity in the 3GPP link using the derived RRC key. For example, referring back to FIG. 10, the cooperative UE 1003 may exchange NAS control plane data 1033 with the base station 1001.

At operation 1306, the apparatus may be configured to transmit the control data to the UE in the non-3GPP link.

Figure 14:
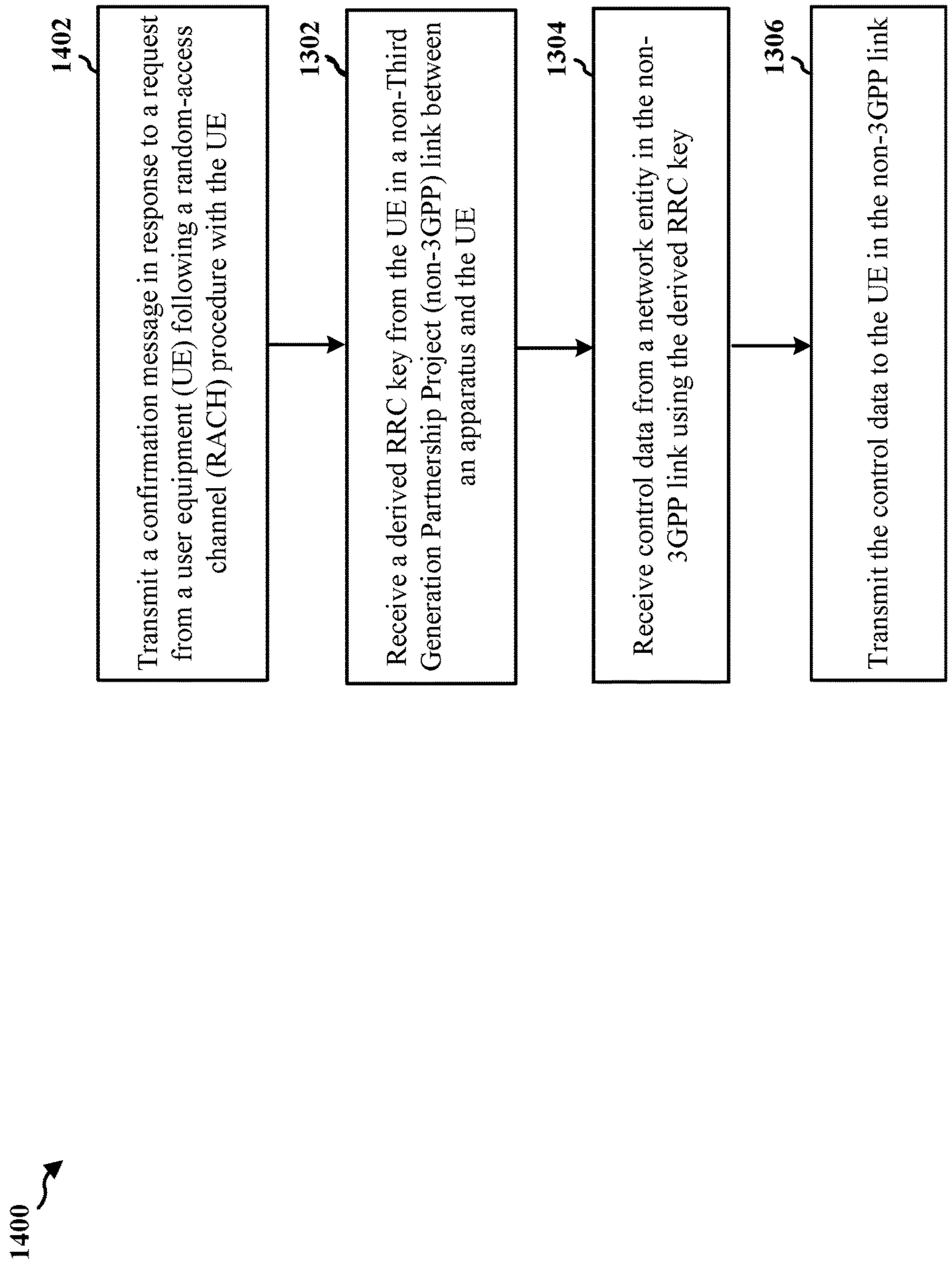

FIG. 14 is a flow chart of a method 1400 of wireless communication at a cooperative UE. The method 1400 may be performed by or at a UE (e.g., the UE 104), another wireless communications apparatus (e.g., the apparatus 2202), or one or more components thereof. According to various different aspects, one or more of the illustrated methods 1400 may be omitted, transposed, and/or contemporaneously performed. The method 1400 allows for providing coverage extension to a target UE.

The method 1400 may be performed by an apparatus, such as a coverage extension component 198, as described above. In some implementations, the method 1400 is performed by processing logic, including hardware, firmware, software, or a combination thereof. In some implementations, the method 1400 is performed by a processor executing code stored in a non-transitory computer-readable medium (e.g., a memory). In the method 1400, operations 1302, 1304, and 1306 are performed as described above in connection with FIG. 13.

At operation 1402, the apparatus may be configured to transmit a confirmation message in response to the request from the UE following a random-access channel (RACH) procedure with the UE. For example, referring back to FIG. 10, the cooperative UE 1003 may transmit a confirmation message 1027 to the target UE 1005. In some aspects, the derived RRC key is received following a request from the UE in the non-3GPP link for the apparatus to cooperate in relaying communications between the UE and the network entity. In some aspects, the derived RRC key is received following an association of the UE with the apparatus. For example, referring back to FIG. 10, the cooperative UE 1003 receives RRC keys 1015 following an association of the UE 1007 with the apparatus.

Figure 15:
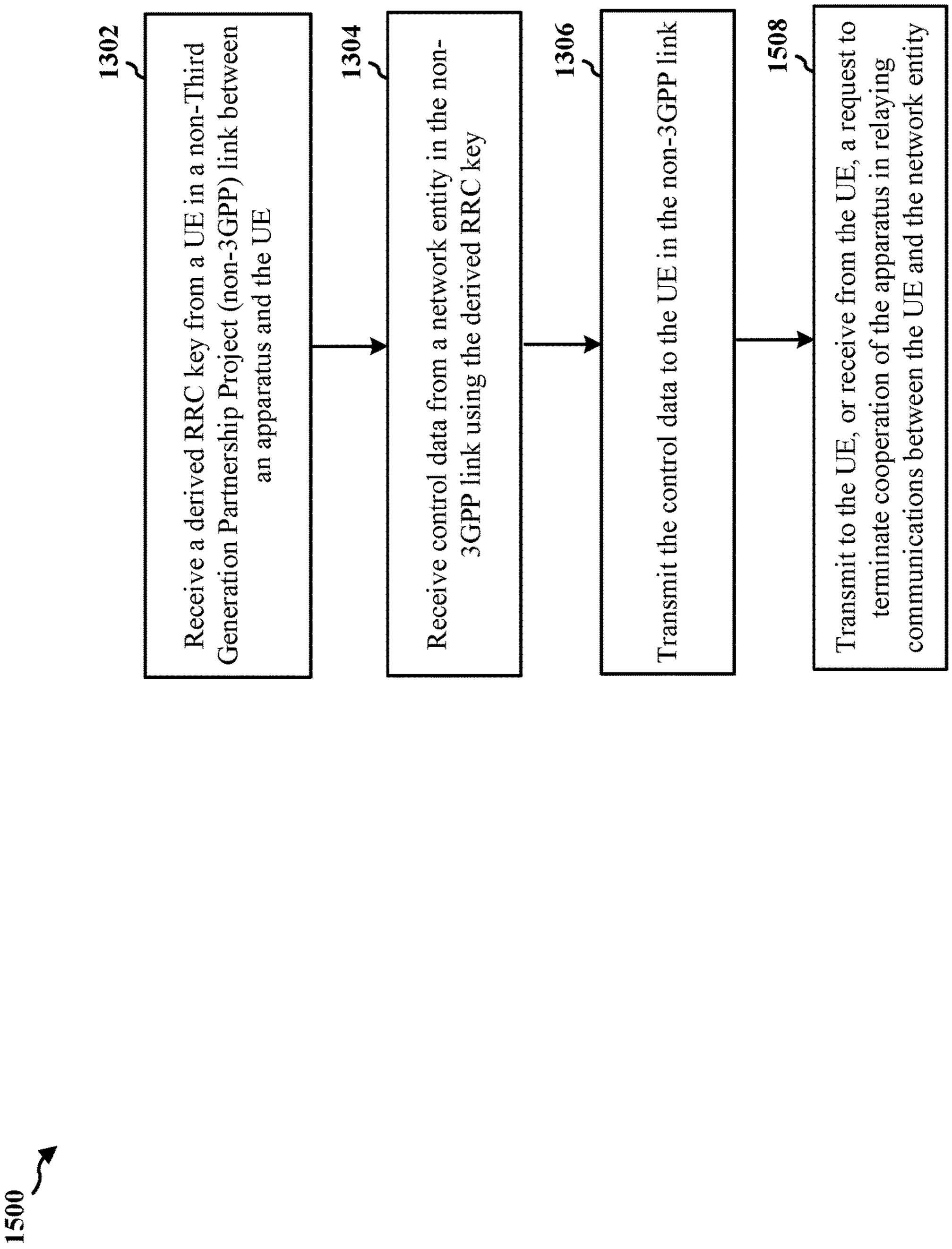

FIG. 15 is a flow chart of a method 1500 of wireless communication at a cooperative UE. The method 1500 may be performed by or at a UE (e.g., the UE 104, 350, 404, 503, 1003), another wireless communications apparatus (e.g., the apparatus 2202), or one or more components thereof. According to various different aspects, one or more of the illustrated methods 1500 may be omitted, transposed, and/or contemporaneously performed. The method 1500 allows for providing coverage extension to a target UE.

The method 1500 may be performed by an apparatus, such as a coverage extension component 198, as described above. In some implementations, the method 1500 is performed by processing logic, including hardware, firmware, software, or a combination thereof. In some implementations, the method 1500 is performed by a processor executing code stored in a non-transitory computer-readable medium (e.g., a memory). In the method 1500, operations 1302, 1304, and 1306 are performed as described above in connection with FIG. 13.

At operation 1508, the apparatus may be configured to transmit to the UE, or receive from the UE, a request to terminate cooperation of the apparatus in relaying communications between the UE and the network entity. For example referring back to FIG. 11, the cooperative UE 1003 may be configured to transmit a confirmation 1037 to the target UE 1005 in response to receiving a terminate cooperation 1035. As another example, referring back to FIG. 11, the cooperative UE 1003 may be configured to receive a request to terminate cooperation 1035 from the target UE 1005.

Figure 16:
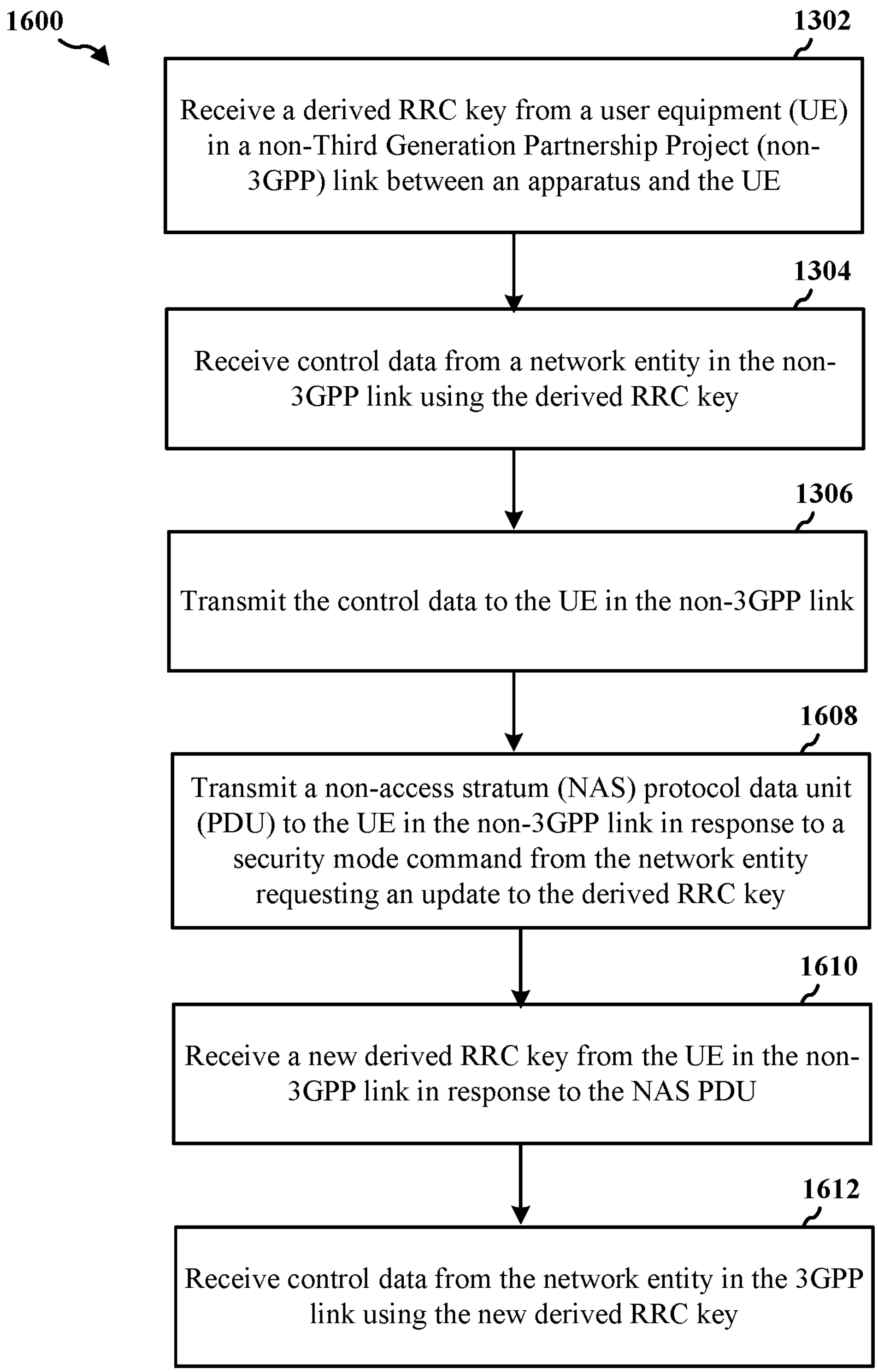

FIG. 16 is a flow chart of a method 1600 of wireless communication at a cooperative UE. The method 1600 may be performed by or at a UE (e.g., the UE 104, 350, 404, 503, 1003), another wireless communications apparatus (e.g., the apparatus 2202), or one or more components thereof. According to various different aspects, one or more of the illustrated methods 1600 may be omitted, transposed, and/or contemporaneously performed. The method 1600 allows for providing coverage extension to a target UE.

The method 1600 may be performed by an apparatus, such as a coverage extension component 198, as described above. In some implementations, the method 1600 is performed by processing logic, including hardware, firmware, software, or a combination thereof. In some implementations, the method 1600 is performed by a processor executing code stored in a non-transitory computer-readable medium (e.g., a memory). In the method 1600, operations 1302, 1304, and 1306 is performed as described above in connection with FIG. 13.

At operation 1608, the apparatus may be configured to transmit a non-access stratum (NAS) protocol data unit (PDU) to the UE in the non-3GPP link in response to a security mode command from the network entity requesting an update to the derived RRC key. As an example, referring back to FIG. 12, the cooperative UE 1003 transmits a NAS PDU 1043 to the target UE 1005 in the Wi-Fi link in response to a security mode command 1041 from the base station 1001.

At operation 1610, the apparatus may be configured to receive a new derived RRC key from the UE in the non-3GPP link in response to the NAS PDU. As an example, referring back to FIG. 12, the cooperative UE 1003 receives new derived RRC keys 1047 from the target UE 1005 in the Wi-Fi link in response to the NAS PDU 1043.

At operation 1612, the apparatus may be configured to receive control data from the network entity in the 3GPP link using the new derived RRC key.

Figure 17:
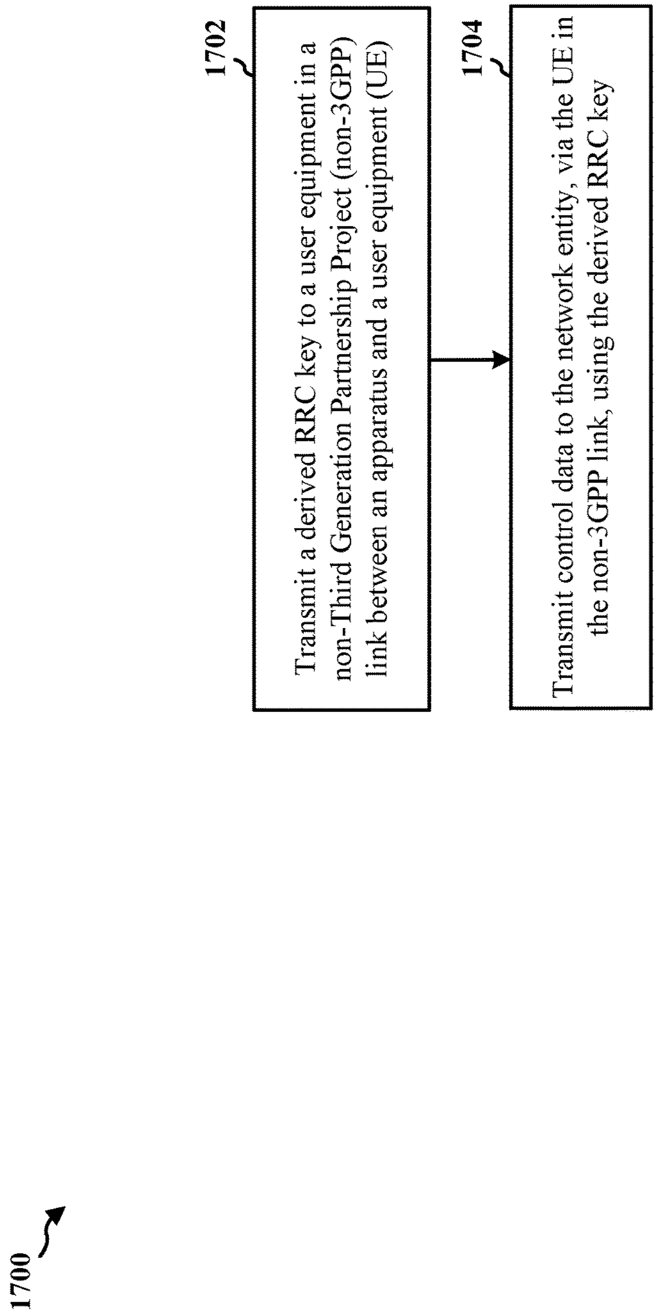
FIGS. 17-21 illustrates example flowcharts illustrating a method of wireless communication at a target UE.

FIG. 17 is a flow chart of a method 1700 of wireless communication at a target UE. The method 1700 may be performed by or at a UE (e.g., the UE 104, 350, 406, 505, 1005), another wireless communications apparatus (e.g., the apparatus 2202), or one or more components thereof. According to various different aspects, one or more of the illustrated methods 1700 may be omitted, transposed, and/or contemporaneously performed. The method 1700 allows for extending coverage to a base station with a cooperative UE.

The method 1700 may be performed by an apparatus, such as a coverage extension component 198, as described above. In some implementations, the method 1700 is performed by processing logic, including hardware, firmware, software, or a combination thereof. In some implementations, the method 1300 is performed by a processor executing code stored in a non-transitory computer-readable medium (e.g., a memory).

At operation 1702, the apparatus may be configured to transmit a derived radio resource control (RRC) key to a user equipment (UE) in a non-Third Generation Partnership Project (non-3GPP) link between the apparatus and the UE. For example, referring back to FIG. 10, the target UE 1006 may transmit derived RRC keys 1015 to the cooperative UE 1003. In some aspects, the non-3GPP link may correspond to a Wi-Fi link. In some aspects, the apparatus may be a UE. For example, referring back to FIG. 4, the apparatus may be the cooperative UE 404, the UE may be the target UE 406, the non-3GPP link may correspond to a Wi-Fi link 405, and the 3GPP link may refer to a 5G network 403. In some aspects, the apparatus is out of coverage of a network entity in a 3GPP link with the UE. For example, referring back to FIG. 4, a transmission reception point (TRP) 402 of a network communicates directly with a cooperative UE 404 and an active target UE 406 is located outside a coverage area 403 of the TRP 402 or in a poor radio connection.

At operation 1704, the apparatus may also be configured to transmit control data to the network entity, via the UE in the non-3GPP link, using the derived RRC key. For example, referring back to FIG. 10, the target UE 1005 may exchange NAS control plane data 1033 with the cooperative UE 1003. As yet another example, referring back to FIG. 12, the target UE 1005 may exchange user plane data 1057 with the cooperative UE 1003.

Figure 18:
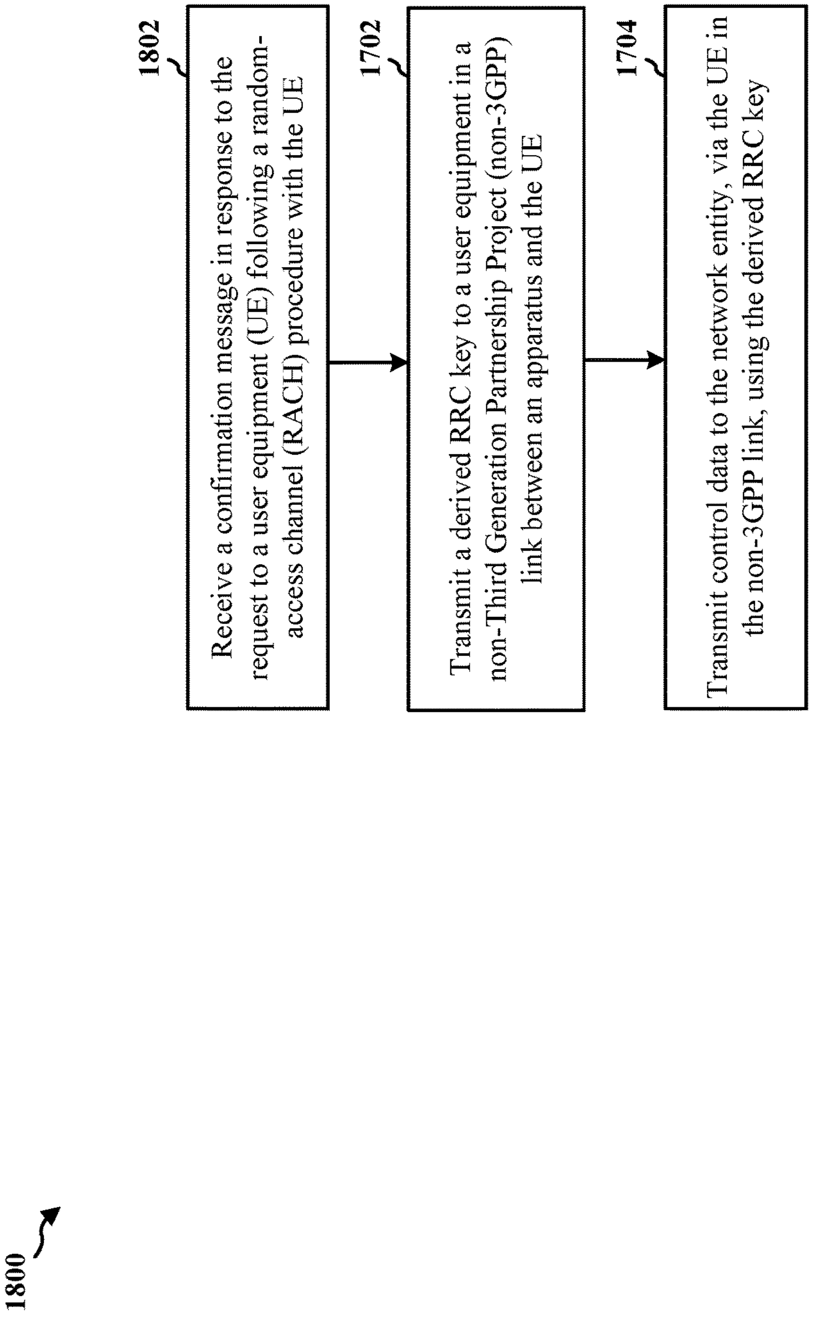

FIG. 18 is a flow chart of a method 1800 of wireless communication at a target UE. The method 1800 may be performed by or at a UE (e.g., the UE 104, 350, 406, 505, 1005), another wireless communications apparatus (e.g., the apparatus 2202), or one or more components thereof. According to various different aspects, one or more of the illustrated methods 1800 may be omitted, transposed, and/or contemporaneously performed. The method 1800 allows for extending coverage to a base station with a cooperative UE.

The method 1800 may be performed by an apparatus, such as a coverage extension component 198, as described above. In some implementations, the method 1800 is performed by processing logic, including hardware, firmware, software, or a combination thereof. In some implementations, the method 1300 is performed by a processor executing code stored in a non-transitory computer-readable medium (e.g., a memory). In the method 1800, operations 1702 and 1704 are performed as described above in connection with FIG. 17.

At operation 1802, the apparatus may be configured to receive a confirmation message in response to the request to a user equipment (UE) following a random-access channel (RACH) procedure with the UE. For example, referring back to FIG. 10, the target UE 1005 may receive a confirmation message 1027 from the cooperative UE 1003 following the RACH procedure 1017, 1019, 1021, 1023, and 1025 procedure between the cooperative UE 1003 and the base station 1001.

In some aspects, the derived RRC key is transmitted after transmitting a request to the UE in the non-3GPP link for the apparatus to cooperate in relaying communications between the UE and the network entity. For example, referring back to FIG. 10, the target UE 1005 transmits the derived RRC keys 1015 to the cooperative UE 1003 after transmitting a request for cooperation 1013. In some aspects, the derived RRC key is sent following an association of the UE with the apparatus. For example, referring back to FIG. 10, the target UE 1005 sends the derived RRC keys 1015 after transmitting an association 1007.

Figure 19:
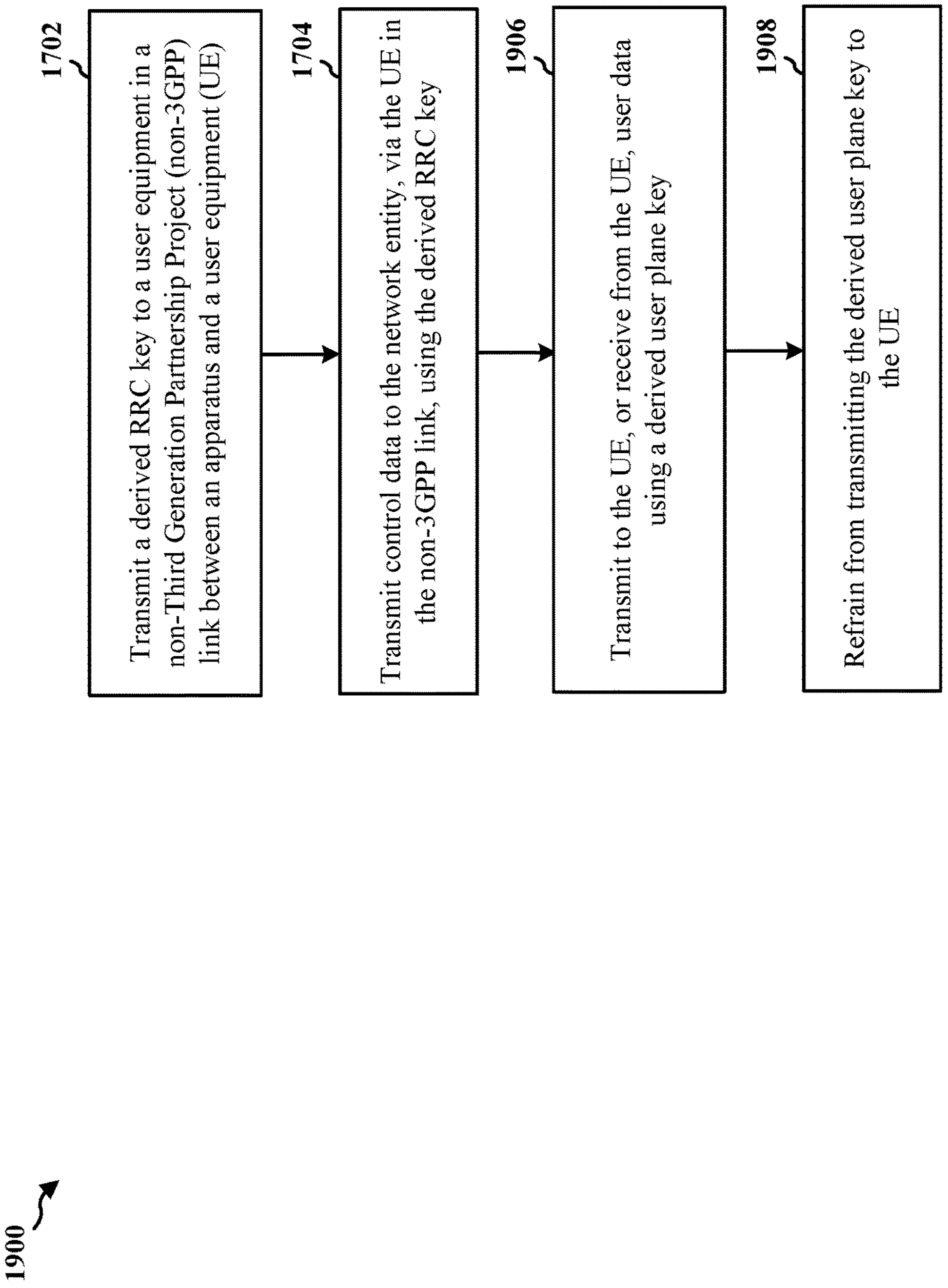

FIG. 19 is a flow chart of a method 1900 of wireless communication at a target UE. The method 1900 may be performed by or at a UE (e.g., the UE 104, 350, 406, 505, 1005), another wireless communications apparatus (e.g., the apparatus 2202), or one or more components thereof. According to various different aspects, one or more of the illustrated methods 1900 may be omitted, transposed, and/or contemporaneously performed. The method 1900 allows for extending coverage to a base station with a cooperative UE.

The method 1900 may be performed by an apparatus, such as a coverage extension component 198, as described above. In some implementations, the method 1900 is performed by processing logic, including hardware, firmware, software, or a combination thereof. In some implementations, the method 1900 is performed by a processor executing code stored in a non-transitory computer-readable medium (e.g., a memory). In the method 1900, operations 1702 and 1704 are performed as described above in connection with FIG. 17.

At operation 1906, the apparatus may also be configured to transmit to the UE, or receive from the UE, user data using a derived user plane key.

At operation 1908, the apparatus may also be configured to refrain from transmitting the derived user plane key to the UE.

Figure 20:
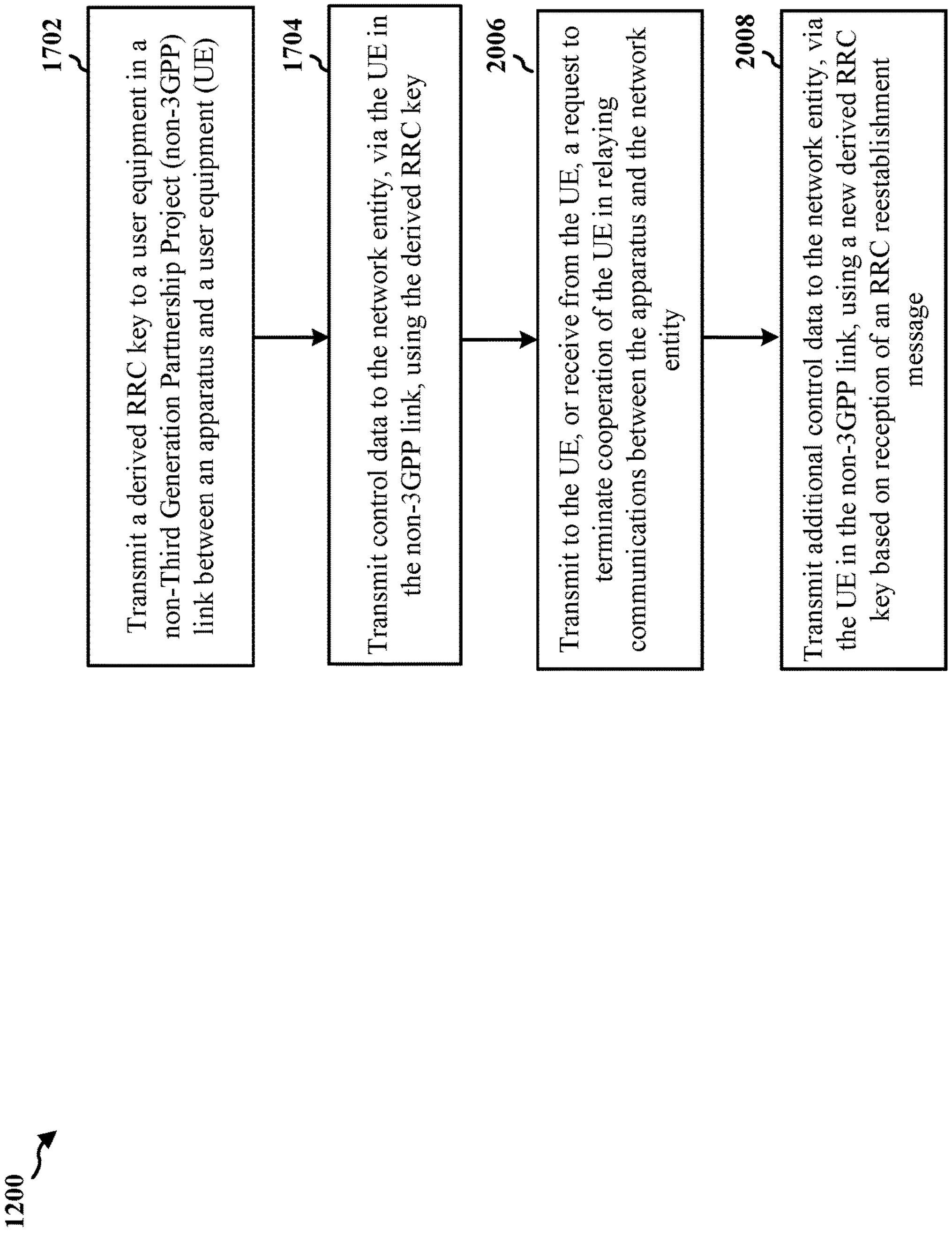

FIG. 20 is a flow chart of a method 2000 of wireless communication at a target UE. The method 2000 may be performed by or at a UE (e.g., the UE 104, 350, 406, 505, 1005), another wireless communications apparatus (e.g., the apparatus 2202), or one or more components thereof. According to various different aspects, one or more of the illustrated methods 2000 may be omitted, transposed, and/or contemporaneously performed. The method 2000 allows for extending coverage to a base station with a cooperative UE.

The method 2000 may be performed by an apparatus, such as a coverage extension component 198, as described above. In some implementations, the method 2000 is performed by processing logic, including hardware, firmware, software, or a combination thereof. In some implementations, the method 2000 is performed by a processor executing code stored in a non-transitory computer-readable medium (e.g., a memory). In the method 2000, operations 1702 and 1704 are performed as described above in connection with FIG. 17.

At operation 2006, the apparatus may be configured to transmit to the UE, or receive from the UE, a request to terminate cooperation of the UE in relaying communications between the apparatus and the network entity. For example, referring back to FIG. 11, the target UE 1005 transmits a request to terminate cooperation 1035 to the cooperative UE 1003. As another example, referring back to FIG. 11, the target UE 1005 receives a request to terminate cooperation 1039 from the cooperative UE 1003.

At operation 2008, the apparatus may be configured to transmit additional control data to the network entity, via the UE in the non-3GPP link, using a new derived RRC key based on reception of an RRC reestablishment message. For example, referring back to FIG. 11, the target UE 1005 may establish a RRC connection with the base station 1001.

Figure 21:
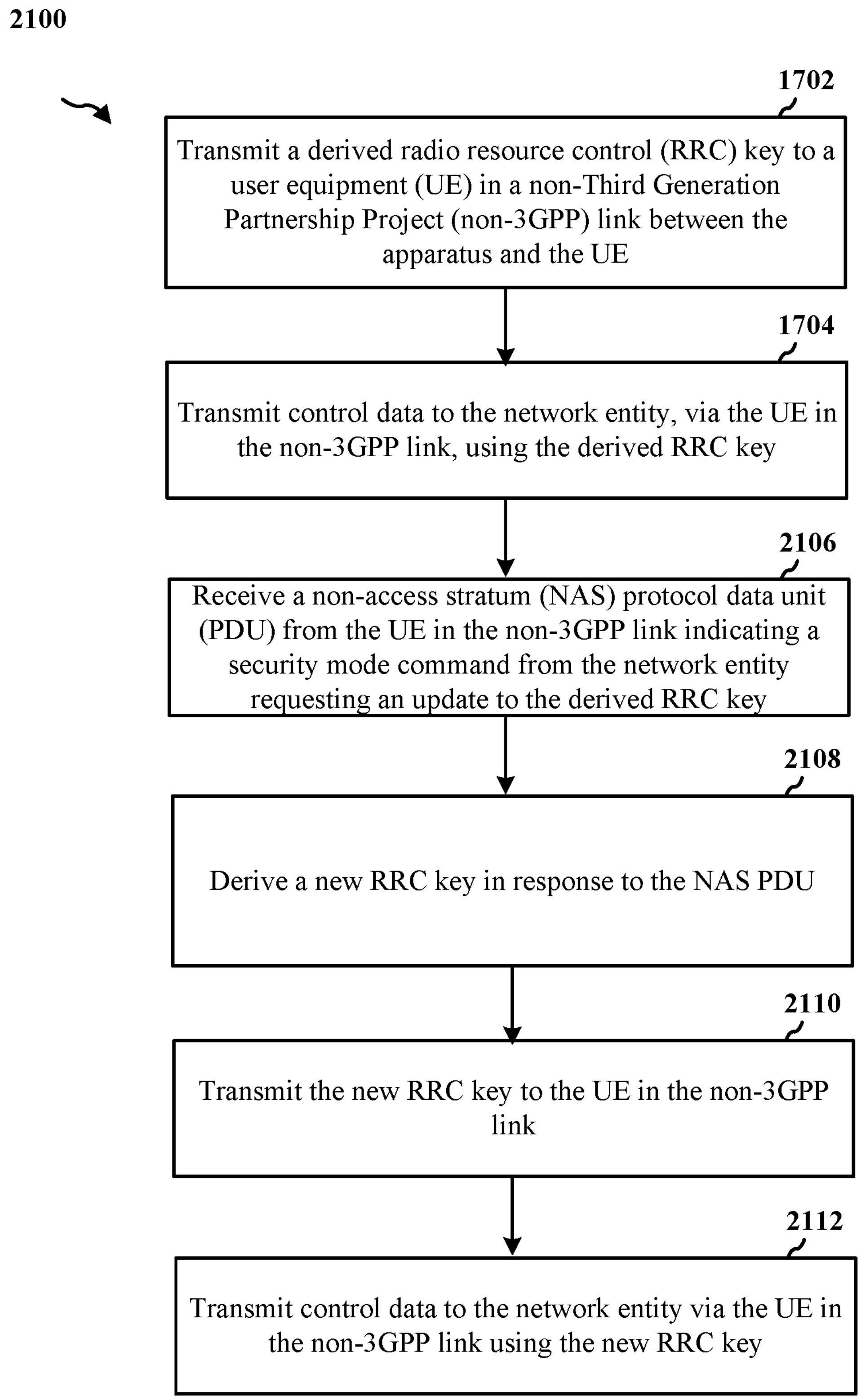

FIG. 21 is a flow chart of a method 2100 of wireless communication at a target UE. The method 2100 may be performed by or at a UE (e.g., the UE 104, 350, 406, 505, 1005), another wireless communications apparatus (e.g., the apparatus 2202), or one or more components thereof. According to various different aspects, one or more of the illustrated methods 2100 may be omitted, transposed, and/or contemporaneously performed. The method 2100 allows for extending coverage to a base station with a cooperative UE.

The method 2100 may be performed by an apparatus, such as a coverage extension component 198, as described above. In some implementations, the method 2100 is performed by processing logic, including hardware, firmware, software, or a combination thereof. In some implementations, the method 2100 is performed by a processor executing code stored in a non-transitory computer-readable medium (e.g., a memory). In the method 2100, operations 1702 and 1704 are performed as described above in connection with FIG. 17.

At operation 2106, the apparatus may be configured to receive a non-access stratum (NAS) protocol data unit (PDU) from the UE in the non-3GPP link indicating a security mode command from the network entity requesting an update to the derived RRC key. For example, referring back to FIG. 12, the target UE 1005 may receive a NAS PDU 1043 from the cooperative UE 1003 in the Wi-Fi link indicating a security mode command 1041 from the base station 1001.

At operation 2108, the apparatus may be configured to derive a new RRC key in response to the NAS PDU. For example, referring back to FIG. 12, the target UE 1005 derives new RRC keys in response to the NAS PDU 1043 received from the cooperative UE 1003.

At operation 2110, the apparatus may be configured to transmit the new RRC key to the UE in the non-3GPP link. For example, referring back to FIG. 12, the target UE 1005 transmits new derived RRC keys 1047 to the cooperative UE 1003.

At operation 2112, the apparatus may be configured to transmit control data to the network entity via the UE in the non-3GPP link using the new RRC key.

Figure 22:
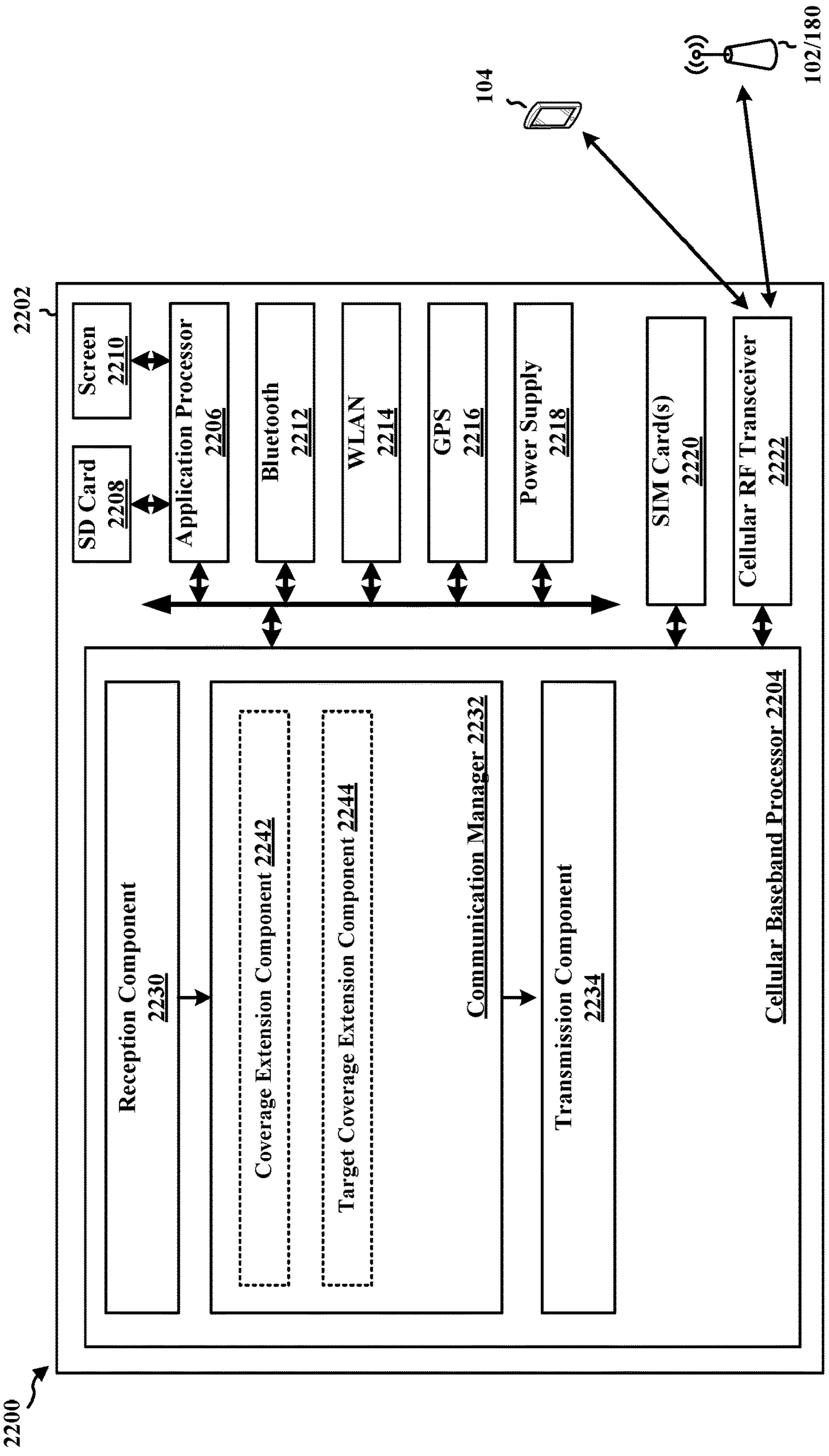
FIG. 22 is a diagram illustrating an example of a hardware implementation for an example apparatus.

FIG. 22 is a diagram 2200 illustrating an example of a hardware implementation for an apparatus 2202. The apparatus 2202 may be a UE (the UE 104, 350, 404, 406, 503, 505, 1003, 1005) or similar device, or the apparatus 2202 may be a component of a UE or similar device. The apparatus 2202 may include a cellular baseband processor 2204 (also referred to as a modem) and/or a cellular RF transceiver 2222, which may be coupled together and/or integrated into the same package, component, circuit, chip, and/or other circuitry.

In some aspects, the apparatus 2202 may accept or may include one or more subscriber identity modules (SIM) cards 2220, which may include one or more integrated circuits, chips, or similar circuitry, and which may be removable or embedded. The one or more SIM cards 2220 may carry identification and/or authentication information, such as an international mobile subscriber identity (IMSI) and/or IMSI-related key(s). Further, the apparatus 2202 may include one or more of an application processor 2206 coupled to a secure digital (SD) card 2208 and a screen 2210, a Bluetooth module 2212, a wireless local area network (WLAN) module 2214, a Global Positioning System (GPS) module 2216, and/or a power supply 2218.

The cellular baseband processor 2204 communicates through the cellular RF transceiver 2222 with the UE 104, 350, 404, 406, 503, 505, 1003, 1005 and/or network device 102/180. The cellular baseband processor 2204 may include a computer-readable medium/memory. The computer-readable medium/memory may be non-transitory. The cellular baseband processor 2204 is responsible for general processing, including the execution of software stored on the computer-readable medium/memory. The software, when executed by the cellular baseband processor 2204, causes the cellular baseband processor 2204 to perform the various functions described supra. The computer-readable medium/memory may also be used for storing data that is manipulated by the cellular baseband processor 2204 when executing software. The cellular baseband processor 2204 further includes a reception component 2230, a communication manager 2232, and a transmission component 2234. The communication manager 2232 includes the one or more illustrated components. The components within the communication manager 2232 may be stored in the computer-readable medium/memory and/or configured as hardware within the cellular baseband processor 2204.

In the context of FIG. 3, the cellular baseband processor 2204 may be a component of the UE 350 and may include the memory 360 and/or at least one of the TX processor 368, the RX processor 356, and/or the controller/processor 359. In one configuration, the apparatus 2202 may be a modem chip and/or may be implemented as the cellular baseband processor 2204, while in another configuration, the apparatus 2202 may be the entire UE (e.g., the UE 350 of FIG. 3) and may include some or all of the abovementioned components, circuits, chips, and/or other circuitry illustrated in the context of the apparatus 2202. In one configuration, the cellular RF transceiver 2222 may be implemented as at least one of the transmitter 354TX and/or the receiver 354RX.

The reception component 2230 may be configured to receive signaling on a wireless channel, such as signaling from a network device 102/180 or UE 104. The transmission component 2234 may be configured to transmit signaling on a wireless channel, such as signaling to a network device 102/180 or UE 104. The communication manager 2232 may coordinate or manage some or all wireless communications by the apparatus 2202, including across the reception component 2230 and the transmission component 2234.

The reception component 2230 may provide some or all data and/or control information included in received signaling to the communication manager 2232, and the communication manager 2232 may generate and provide some or all of the data and/or control information to be included in transmitted signaling to the transmission component 2234. The communication manager 2232 may include the various illustrated components, including one or more components configured to process received data and/or control information, and/or one or more components configured to generate data and/or control information for transmission.

The communication manager 2232 includes a coverage extension component 2242 that is configured to receive a derived radio resource control (RRC) key from a user equipment (UE) in a non-Third Generation Partnership Project (non-3GPP) link between the apparatus and the UE, e.g., as described in connection with operation 1302 from FIG. 13. The coverage extension component 2242 is also configured to receive control data from the network entity in the 3GPP link using the derived RRC key and transmit the control data to the UE in the non-3GPP link, e.g., as described in connection with operation 1304 from FIG. 13. For example, referring back to FIGS. 6-9, the Wi-Fi modem 607, 707, 811, and 907 of the cooperative UE may transmit control data to the Wi-Fi modem 609, 709, 809, and 909 of the target UE. As another example, referring back to FIGS. 10 and 12, the target UE 1005 and the cooperative UE 1003 exchange user plane data 1031, and 1057.

In some aspects, the communication manager 2232 also includes a coverage extension component 2244 that is configured to transmit a derived radio resource control (RRC) key to a user equipment (UE) in a non-Third Generation Partnership Project (non-3GPP) link between the apparatus and the UE, e.g., as described in connection with operation 1702 from FIG. 17. The target coverage extension component 2244 is also configured to transmit control data to the network entity, via the UE in the non-3GPP link, using the derived RRC key, e.g., as described in connection with operation 1704 from FIG. 17. For example, referring back to FIGS. 6-9, the Wi-Fi modem 607, 707, 811, and 907 of the cooperative UE may transmit control data to the Wi-Fi modem 609, 709, 809, and 909 of the target UE. As another example, referring back to FIGS. 10 and 12, the target UE 1005 and the cooperative UE 1003 exchange user plane data 1031, and 1057.

The apparatus 2202 may include additional components that perform some or all of the blocks, operations, signaling, etc. of the algorithm(s) in the aforementioned call flow diagram(s) and/or flowchart(s) of FIGS. 6-21. As such, some or all of the blocks, operations, signaling, etc. in the aforementioned call flow diagram(s) and/or flowchart(s) of FIGS. 6-21 may be performed by one or more components and the apparatus 2202 may include one or more such components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2202, and in particular the cellular baseband processor 2204, may include means for receiving a derived key from a UE in a non-3GPP link, the derived key being associated with a RRC layer of the apparatus; and transmitting control data to the UE in the non-3GPP link using the derived key, the control data being associated with a 3GPP link between the apparatus and the network entity. For example, referring back to FIGS. 6-9, the Wi-Fi modem 607, 707, 811, and 907 of the cooperative UE may transmit control data to the Wi-Fi modem 609, 709, 809, and 909 of the target UE. As another example, referring back to FIGS. 10 and 12, the target UE 1005 and the cooperative UE 1003 exchange user plane data 1031, and 1057.

The aforementioned means may be one or more of the aforementioned components of the apparatus 2202 configured to perform the functions recited by the aforementioned means. As described supra, the apparatus 2202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Aspects of the present disclosure allow for a target UE to utilize a cooperative device to communicate with a base station when the target UE is out of coverage or in poor radio connections, but can still connect to another UE over a non-3GPP technology. Aspects of the present disclosure allow a UE to appear to a 3GPP network (e.g., 5G/LTE) as a target device while utilizing the hardware and software of the cooperative device such that the network is unaware that the cooperative UE is being used as a relay by the target UE. Aspects of the present disclosure allow the base station to communicate with the cooperative UE using a 3GPP link while the communication related to the target UE between the cooperative UE and the target UE will be via a non-3GPP link. Using a non-3GPP link allows aspects of the present disclosure to be transparent to the network such that the communicating devices do not require coordination between the network and devices according to any standardized agreement. Instead, the UEs may associate with each other or discover each other independently of the base station using Wi-Fi protocols and the base station simply relies on the cooperative UE to communicate with the target UE.

The specific order or hierarchy of blocks or operations in each of the foregoing processes, flowcharts, and other diagrams disclosed herein is an illustration of example approaches. Based upon design preferences, the specific order or hierarchy of blocks or operations in each of the processes, flowcharts, and other diagrams may be rearranged, omitted, and/or contemporaneously performed without departing from the scope of the present disclosure. Further, some blocks or operations may be combined or omitted. The accompanying method claims present elements of the various blocks or operations in a sample order, and are not meant to be limited to the specific order or hierarchy presented.

SOME ADDITIONAL EXAMPLES

The following examples are illustrative only and may be combined with aspects of other embodiments or teachings described herein, without limitation.

Aspect 1. An apparatus for wireless communication, comprising:

a memory; and at least one processor coupled to the memory and configured to:

receive a derived radio resource control (RRC) key from a user equipment (UE) in a non-Third Generation Partnership Project (non-3GPP) link between the apparatus and the UE;

receive control data from the network entity in the 3GPP link using the derived RRC key; and transmit the control data to the UE in the non-3GPP link.

Aspect 2. The apparatus of aspect 1, wherein the derived RRC key is received following a request from the UE in the non-3GPP link for the apparatus to cooperate in relaying communications between the UE and the network entity.

Aspect 3. The apparatus of aspect 1 or 2, wherein the instructions, when executed by the processor, further cause the processor to:

transmit a confirmation message in response to the request from the UE following a random-access channel (RACH) procedure with the UE.

Aspect 4. The apparatus of any of the aspects 1 to 3, wherein the derived RRC key is received following an association of the UE with the apparatus.

Aspect 5. The apparatus of any of the aspects 1 to 4, wherein the non-3GPP link is a Wi-Fi link.

Aspect 6. The apparatus of any of the aspects 1 to 5, wherein the instructions, when executed by the processor, further cause the processor to:

transmit to the UE, or receive from the UE, a request to terminate cooperation of the apparatus in relaying communications between the UE and the network entity.

Aspect 7. The apparatus of any of the aspects 1 to 6, wherein the instructions, when executed by the processor, further cause the processor to:

transmit a non-access stratum (NAS) protocol data unit (PDU) to the UE in the non-3GPP link in response to a security mode command from the network entity requesting an update to the derived RRC key;

receive a new derived RRC key from the UE in the non-3GPP link in response to the NAS PDU; and receive control data from the network entity in the 3GPP link using the new derived RRC key.

Aspect 8. The apparatus of any of the aspects 1 to 7, the UE is out of coverage of a network entity in a 3GPP link with the apparatus.

Aspect 9. An apparatus for wireless communication, comprising:

a processor;

memory coupled with the processor; and instructions stored in the memory and operable, when executed by the processor, to cause the apparatus to:

transmit a derived radio resource control (RRC) key to a user equipment (UE) in a non-Third Generation Partnership Project (non-3GPP) link between the apparatus and the UE; and transmit control data to the network entity, via the UE in the non-3GPP link, using the derived RRC key.

Aspect 10. The apparatus of aspect 9, wherein the derived RRC key is transmitted after transmitting a request to the UE in the non-3GPP link for the apparatus to cooperate in relaying communications between the UE and the network entity.

Aspect 11. The apparatus of claim 9 or 10, wherein the instructions, when executed by the processor, further cause the processor to:

receive a confirmation message in response to the request to the UE following a random-access channel (RACH) procedure with the UE.

Aspect 12. The apparatus of aspects 9 to 11, wherein the derived RRC key is sent following an association of the UE with the apparatus.

Aspect 13. The apparatus of any of the aspects 9 to 12, wherein the non-3GPP link is a Wi-Fi link and the apparatus is out of coverage of a network entity in a 3GPP link with the UE.

Aspect 14. The apparatus of any of the aspects 9 to 13, wherein the instructions when executed by the processor, further cause the processor to:

transmit to the UE, or receive from the UE, user data using a derived user plane key; and refrain from transmitting the derived user plane key to the UE.

Aspect 15. The apparatus of any of the aspects 9 to 14, wherein instructions when executed by the processor, further cause the processor to:

transmit to the UE, or receive from the UE, a request to terminate cooperation of the UE in relaying communications between the apparatus and the network entity; and transmit additional control data to the network entity, via the UE in the non-3GPP link, using a new derived RRC key based on reception of an RRC reestablishment message.

Aspect 16. The apparatus of any of the aspects 9 to 15, wherein the instructions when executed by the processor, further cause the processor to:

receive a non-access stratum (NAS) protocol data unit (PDU) from the UE in the non-3GPP link indicating a security mode command from the network entity requesting an update to the derived RRC key;

derive a new RRC key in response to the NAS PDU;

transmit the derived new RRC key to the UE in the non-3GPP link; and transmit control data to the network entity via the UE in the non-3GPP link using the derived new RRC key.

Aspect 17. The apparatus of any of the aspects 9 to 16, wherein the apparatus is a UE.

Aspect 18. A method for wireless communication at an apparatus, comprising:

receiving a derived radio resource control (RRC) key from a user equipment (UE) in a non-Third Generation Partnership Project (non-3GPP) link between the apparatus and the UE;

receiving control data from the network entity in the 3GPP link using the derived RRC key; and transmitting the control data to the UE in the non-3GPP link.

Aspect 19. The method of aspect 18 wherein the derived RRC key is received following a request from the UE in the non-3GPP link for the apparatus to cooperate in relaying communications between the UE and the network entity.

Aspect 20. The apparatus of any of the aspects 18 to 19, further comprising:

transmitting a confirmation message in response to the request from the UE following a random-access channel (RACH) procedure with the UE.

Aspect 21. The apparatus of any of the aspects 18 to 20, wherein the derived RRC key is received following an association of the UE with the apparatus.

Aspect 22. The apparatus of any of the aspects 18 to 21, wherein the non-3GPP link is a Wi-Fi link.

Aspect 23. The apparatus of any of the aspects 18 to 22, further comprising:

transmitting to the UE, or receive from the UE, a request to terminate cooperation of the apparatus in relaying communications between the UE and the network entity.

Aspect 24. The apparatus of any of the aspects 18 to 23, further comprising:

transmitting a first NAS PDU in the non-3GPP link in response to receiving a security mode command from the network entity in the 3GPP link;

receiving a second NAS PDU and a new derived key from the UE in the non-3GPP link; and transmitting control data to the UE in the non-3GPP link using the new derived key.

Aspect 25. A method for wireless communication at an apparatus, comprising:

transmitting a derived radio resource control (RRC) key to a user equipment (UE) in a non-Third Generation Partnership Project (non-3GPP) link between the apparatus and the UE; and transmitting control data to the network entity, via the UE in the non-3GPP link, using the derived RRC key.

Aspect 26. The apparatus of aspect 25, wherein the derived RRC key is transmitted after transmitting a request to the UE in the non-3GPP link for the apparatus to cooperate in relaying communications between the UE and the network entity.

Aspect 27. The apparatus of aspect 25 or 26, further comprising:

receiving a confirmation message in response to the request to the UE following a random-access channel (RACH) procedure with the UE.

Aspect 28. The apparatus of any of the aspects 25 to 27, wherein the derived RRC key is received following an association of the UE with the apparatus.

Aspect 29. The method of any of the aspects 25 to 28, wherein the non-3GPP link is a Wi-Fi link.

Aspect 30. The method of any of the aspects 25 or 29, further comprising:

transmitting to the UE, or receive from the UE, user data using a derived user plane key; and refraining from transmitting the derived user plane key to the UE.

The previous description is provided to enable one of ordinary skill in the art to practice the various aspects described herein. Various modifications to these aspects will be readily apparent to those having ordinary skill in the art, and the generic principles defined herein may be applied to other aspects. Thus, the claims are not intended to be limited to the aspects shown herein, but is to be accorded the full scope consistent with the language. Thus, the language employed herein is not intended to limit the scope of the claims to only those aspects shown herein, but is to be accorded the full scope consistent with the language of the claims.

As one example, the language "determining" may encompass a wide variety of actions, and so may not be limited to the concepts and aspects explicitly described or illustrated by the present disclosure. In some contexts, "determining" may include calculating, computing, processing, measuring, deriving, investigating, looking up (e.g., looking up in a table, a database or another data structure), ascertaining, resolving, selecting, choosing, establishing, and so forth. In some other contexts, "determining" may include communication and/or memory operations/procedures through which information or value(s) are acquired, such as “receiving” (e.g., receiving information), “accessing” (e.g., accessing data in a memory), “detecting,” and the like.

As another example, reference to an element in the singular is not intended to mean “one and only one” unless specifically stated, but rather “one or more.” Further, terms such as “if,” “when,” and “while” should be interpreted to mean “under the condition that” rather than imply an immediate temporal relationship or reaction. That is, these phrases, e.g., “when,” do not imply an immediate action in response to or during the occurrence of an action or event, but rather imply that if a condition is met then another action or event will occur, but without requiring a specific or immediate time constraint or direct correlation for the other action or event to occur. The word “exemplary” is used herein to mean “serving as an example, instance, or illustration.” Any aspect described herein as “exemplary” is not necessarily to be construed as preferred or advantageous over other aspects. Unless specifically stated otherwise, the term “some” refers to one or more. Combinations such as “at least one of A, B, or C,” “one or more of A, B, or C,” “at least one of A, B, and C,” “one or more of A, B, and C,” and “A, B, C, or any combination thereof” include any combination of A, B, and/or C, and may include multiples of A, multiples of B, or multiples of C. Specifically, combinations such as “at least one of A, B, or C,” “one or more of A, B, or C,” “at least one of A, B, and C,” “one or more of A, B, and C,” and “A, B, C, or any combination thereof” may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words “module,” “mechanism,” “element,” “device,” and the like may not be a substitute for the word “means.” As such, no claim element is to be construed as a means plus function unless the element is expressly recited using the phrase “means for.”

The invention claimed is:

1. An apparatus for wireless communication, comprising:
- at least one processor;
- one or more memories coupled with the at least one processor; and
- instructions stored in the one or more memories and operable, when executed by the at least one processor, to cause the apparatus to:
  - receive a derived radio resource control (RRC) key from a user equipment (UE) in a non-Third Generation Partnership Project (non-3GPP) link between the apparatus and the UE;
  - receive control data from a network entity in a 3GPP link between the apparatus and the network entity using the derived RRC key; and
  - transmit the control data to the UE in the non-3GPP link.

2. The apparatus of claim 1, wherein the derived RRC key is received following a request from the UE in the non-3GPP link for the apparatus to cooperate in relaying communications between the UE and the network entity.

3. The apparatus of claim 2, wherein the instructions, when executed by the at least one processor, further cause the at least one processor to:
- transmit a confirmation message in response to the request from the UE following a random-access channel (RACH) procedure between the apparatus and the network entity.

4. The apparatus of claim 1, wherein the derived RRC key is received following an association of the UE with the apparatus.

5. The apparatus of claim 1, wherein the non-3GPP link is a Wi-Fi link.

6. The apparatus of claim 1, wherein the instructions, when executed by the at least one processor, further cause the at least one processor to:
- transmit to the UE, or receive from the UE, a request to terminate cooperation of the apparatus in relaying communications between the UE and the network entity.

7. The apparatus of claim 1, wherein the instructions, when executed by the at least one processor, further cause the at least one processor to:
- transmit a non-access stratum (NAS) protocol data unit (PDU) to the UE in the non-3GPP link in response to a security mode command from the network entity requesting an update to the derived RRC key;
- receive a new derived RRC key from the UE in the non-3GPP link in response to the NAS PDU; and
- receive control data from the network entity in the 3GPP link using the new derived RRC key.

8. The apparatus of claim 1, wherein the apparatus is another UE that is in coverage of the network entity.

9. The apparatus of claim 8, wherein the UE is out of coverage of the network entity in the 3GPP link with the apparatus.

10. An apparatus for wireless communication, comprising:
- at least one processor;
- one or more memories coupled with the at least one processor; and
- instructions stored in the one or more memories and operable, when executed by the at least one processor, to cause the apparatus to:
  - transmit a derived radio resource control (RRC) key to a user equipment (UE) in a non-Third Generation Partnership Project (non-3GPP) link between the apparatus and the UE; and
  - transmit control data to a network entity in a 3GPP link between the UE and the network entity, via the UE in the non-3GPP link, using the derived RRC key.

11. The apparatus of claim 10, wherein the derived RRC key is transmitted after transmitting a request to the UE in the non-3GPP link for the UE to cooperate in relaying communications between the apparatus and the network entity.

12. The apparatus of claim 11, wherein the instructions, when executed by the at least one processor, further cause the at least one processor to:
- receive a confirmation message in response to the request to the UE following a random-access channel (RACH) procedure between the UE and the network entity.

13. The apparatus of claim 10, wherein the derived RRC key is transmitted following an association of the UE with the apparatus.

14. The apparatus of claim 10, wherein the non-3GPP link is a Wi-Fi link.

15. The apparatus of claim 10, wherein the instructions when executed by the at least one processor, further cause the at least one processor to:

transmit to the UE, or receive from the UE, user data using a derived user plane key; and refrain from transmitting the derived user plane key to the UE.

16. The apparatus of claim 10, wherein the instructions when executed by the at least one processor, further cause the at least one processor to:

transmit to the UE, or receive from the UE, a request to terminate cooperation of the UE in relaying communications between the apparatus and the network entity; and transmit additional control data to the network entity, via the UE in the non-3GPP link, using a new derived RRC key based on reception of an RRC reestablishment message.

17. The apparatus of claim 10, wherein the instructions when executed by the at least one processor, further cause the at least one processor to:

receive a non-access stratum (NAS) protocol data unit (PDU) from the UE in the non-3GPP link indicating a security mode command from the network entity requesting an update to the derived RRC key;

derive a new RRC key in response to the NAS PDU;

transmit the derived new RRC key to the UE in the non-3GPP link; and transmit control data to the network entity via the UE in the non-3GPP link using the derived new RRC key.

18. The apparatus of claim 10, wherein the UE is in coverage of the network entity, and the apparatus is another UE that is out of coverage of the network entity in the 3GPP link with the UE.

19. A method for wireless communication at an apparatus, comprising:

receiving a derived radio resource control (RRC) key from a user equipment (UE) in a non-Third Generation Partnership Project (non-3GPP) link between the apparatus and the UE;

receiving control data from a network entity in a 3GPP link between the apparatus and the network entity using the derived RRC key; and transmitting the control data to the UE in the non-3GPP link.

20. The method of claim 19, wherein the derived RRC key is received following a request from the UE in the non-3GPP link for the apparatus to cooperate in relaying communications between the UE and the network entity.

21. The method of claim 20, further comprising:

transmitting a confirmation message in response to the request from the UE following a random-access channel (RACH) procedure between the apparatus and the network entity.

22. The method of claim 19, wherein the derived RRC key is received following an association of the UE with the apparatus.

23. The method of claim 19, wherein the non-3GPP link is a Wi-Fi link.

24. The method of claim 19, further comprising:

transmitting to the UE, or receiving from the UE, a request to terminate cooperation of the apparatus in relaying communications between the UE and the network entity.

25. The method of claim 19, further comprising:

transmitting a non-access stratum (NAS) protocol data unit (PDU) to the UE in the non-3GPP link in response to a security mode command from the network entity requesting an update to the derived RRC key;

receiving a new derived RRC key from the UE in the non-3GPP link in response to the NAS PDU; and receiving control data from the network entity in the 3GPP link using the new derived RRC key.

26. A method for wireless communication at an apparatus, comprising:

transmitting a derived radio resource control (RRC) key to a user equipment (UE) in a non-Third Generation Partnership Project (non-3GPP) link between the apparatus and the UE; and transmitting control data to a network entity in a 3GPP link between the UE and the network entity, via the UE in the non-3GPP link, using the derived RRC key.

27. The method of claim 26, wherein the derived RRC key is transmitted after transmitting a request to the UE in the non-3GPP link for the UE to cooperate in relaying communications between the apparatus and the network entity.

28. The method of claim 27, further comprising:

receiving a confirmation message in response to the request to the UE following a random-access channel (RACH) procedure between the UE and the network entity.

29. The method of claim 26, wherein the derived RRC key is transmitted following an association of the UE with the apparatus.

30. The method of claim 26, wherein the non-3GPP link is a Wi-Fi link.

* * * * *